Aug. 11, 1959 C. E. LOMAX 2,899,501

TELEPHONE SYSTEM WITH INDUCTIVE PULSING

Filed Dec. 26, 1956 11 Sheets-Sheet 1

INVENTOR.
CLARENCE E. LOMAX
BY
C. A. Gulbrandsen
ATTY.

TELEPHONE SYSTEM WITH INDUCTIVE PULSING

Filed Dec. 26, 1956 11 Sheets-Sheet 2

INVENTOR.
CLARENCE E. LOMAX
BY
C. A. Gulbrandsen
ATTY.

Aug. 11, 1959 C. E. LOMAX 2,899,501

TELEPHONE SYSTEM WITH INDUCTIVE PULSING

Filed Dec. 26, 1956 11 Sheets-Sheet 3

FIG. 3 PRIMARY TRUNK REPEATER

INVENTOR.
CLARENCE E. LOMAX

BY C. A. Gulbrandsen

ATTY.

INVENTOR.
CLARENCE E. LOMAX
BY C. A. Gulbrandsen
ATTY.

Aug. 11, 1959 C. E. LOMAX 2,899,501

TELEPHONE SYSTEM WITH INDUCTIVE PULSING

Filed Dec. 26, 1956 11 Sheets-Sheet 5

SELECTOR

INVENTOR.
CLARENCE E. LOMAX
BY
C. A. Gulbrandsen
ATTY.

TELEPHONE SYSTEM WITH INDUCTIVE PULSING

Filed Dec. 26, 1956 11 Sheets-Sheet 6

CONNECTOR

INVENTOR.
CLARENCE E. LOMAX
BY C. A. Gulbrandsen
ATTY.

TELEPHONE SYSTEM WITH INDUCTIVE PULSING

Filed Dec. 26, 1956 11 Sheets-Sheet 7

SELECTOR

INVENTOR.
CLARENCE E. LOMAX
BY
C. A. Gulbrandsen
ATTY.

INVENTOR.
CLARENCE E. LOMAX
BY
C. A. Gulbrandsen
ATTY.

TELEPHONE SYSTEM WITH INDUCTIVE PULSING

Filed Dec. 26, 1956 11 Sheets-Sheet 9

REPEATER

INVENTOR.
CLARENCE E. LOMAX
BY
C. A. Gullbrandsen
ATTY.

REPEATER

INVENTOR.
CLARENCE E. LOMAX
BY
C. A. Bullbrandsen
ATTY.

Aug. 11, 1959 C. E. LOMAX 2,899,501
TELEPHONE SYSTEM WITH INDUCTIVE PULSING
Filed Dec. 26, 1956 11 Sheets-Sheet 11
FIG. 11 REPEATER
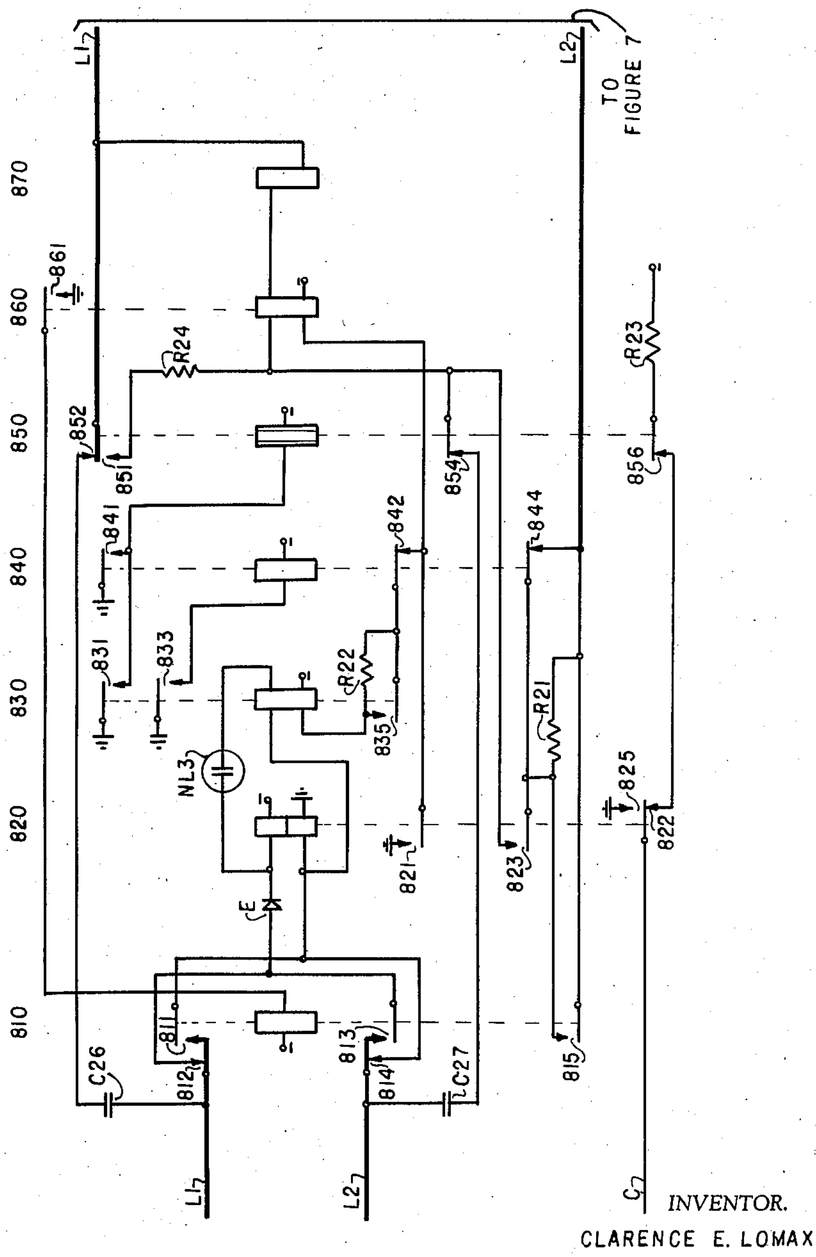
INVENTOR.
CLARENCE E. LOMAX
BY C. A. Bullrandsen
ATTY.

United States Patent Office 2,899,501

Patented Aug. 11, 1959

2,899,501

TELEPHONE SYSTEM WITH INDUCTIVE PULSING

Clarence E. Lomax, Chicago, Ill., assignor to General Telephone Laboratories, Incorporated, a corporation of Delaware Application December 26, 1956, Serial No. 630,568

40 Claims. (Cl. 179—16)

The present invention relates in general to telephone systems and is more particularly concerned with improved methods of pulsing telephone switching equipment.

The present invention discloses a means for pulsing telephone switches which does not require that the usual line relay, of the switch being pulsed, release its contacts for every pulse received from the opening of the dial pulse springs.

In the switches to be described, the line relay may be maintained operated throughout pulsing and need never release its contacts. This is made possible by utilizing the inductive "kick" generated in the windings of the line relay to operate another relay, which relay in turn operates the magnets and causes the switch wiper to be advanced in the usual manner. By use of the inductive kick, it can be seen that the contacts associated with the line relay do not have to follow the pulses sent by the dial springs. This feature provides for improved pulsing over long lines where the resistance is high and over lines which have a leak and over other various and sundry types of adverse line conditions.

The only requirement in this manner of pulsing is that the flow of current through the line relay must build up a magnetic field which, when it collapses due to the reduced current flow in the line circuit by the dial pulse springs, will cause an inductive "kick." If this requirement is met, the switch will operate properly whether the contacts associated with the line relay operate or not.

From what has been said it is readily apparent that if the line relay could hold its contacts operated throughout pulsing, the usual release relay would be unnecessary because the line relay could function as a release relay. Since an effective inductive "kick" can be created by merely decreasing the current flow through the line relay, it is, at the same time, possible to maintain a sufficient flow of current through the line relay to hold the contacts associated with that relay, in their operated position during the entire series of pulses. In accordance with one of the features of this disclosure a substation circuit is shown in which the dial pulse springs are bridged with a resistance. When the dial springs are closed for each pulse, the resistance is shunted and full current is permitted to flow through the line relay. Upon the opening of the dial springs for each pulse, the shunt on the aforementioned resistance is removed and this resistance is placed in series with the line relay thereby causing a decrease in the current flow. The resistance used is of such a value that the line relay will still hold its contacts operated but at the same time, the sudden decrease of current caused by the resistance will cause the pulsing relay to give an inductive "kick," thereby ultimately operating the magnets which in turn advance the switch wipers.

Having read the brief description of the basic operation of this invention, the reader should be sufficiently prepared to understand the following specification. Additional features of this invention will become apparent upon a perusal of this specification taken in conjunction with the drawings.

Figure 1 shows a trunking diagram showing the manner in which inductive pulsing may be used for an entire telephone system. It will be noted that 3 offices are shown and it is assumed that these offices are all in the same city. By thus illustrating 3 offices, the use of various types of switches can properly be explained.

Figure 2 shows a substation circuit in which the dial pulse springs are bridged with a resistance, to permit closed circuit pulsing.

Figure 3 illustrates a repeater which is used to repeat pulses to standard switching equipment. The pulses repeated by this repeater are controlled by a relay operated by inductive pulses from the line relay. This repeater is equipped with a release relay and may therefore be operated by pulses from a standard substation circuit as well as by the substation circuit shown in Figure 2.

Figure 10:
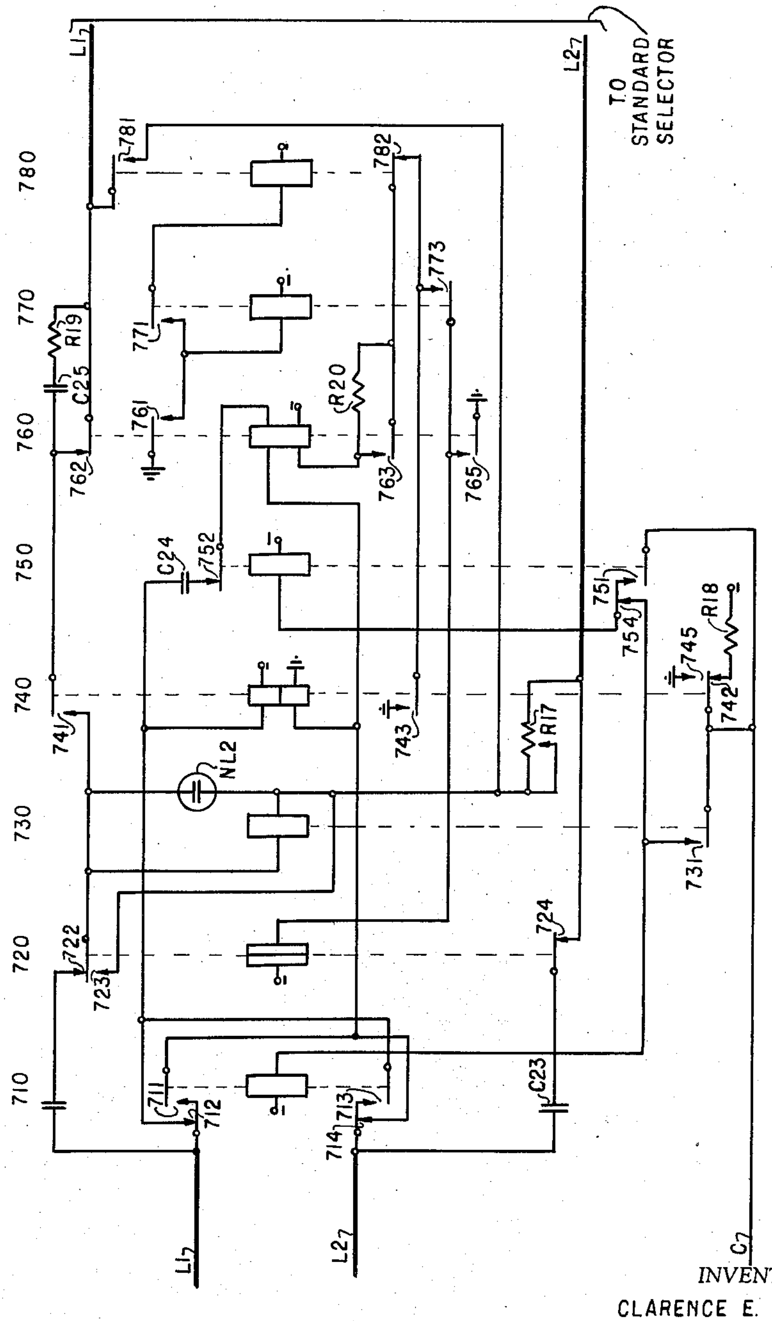

Figure 10 illustrates a repeater which has no release relay. It is necessary that the pulses received by this repeater are closed circuit pulses in order to prevent the line relay from restoring. The outgoing trunks are opened for each outgoing pulse due to the fact that this repeater transmits pulses to standard switching equipment.

Figure 7:
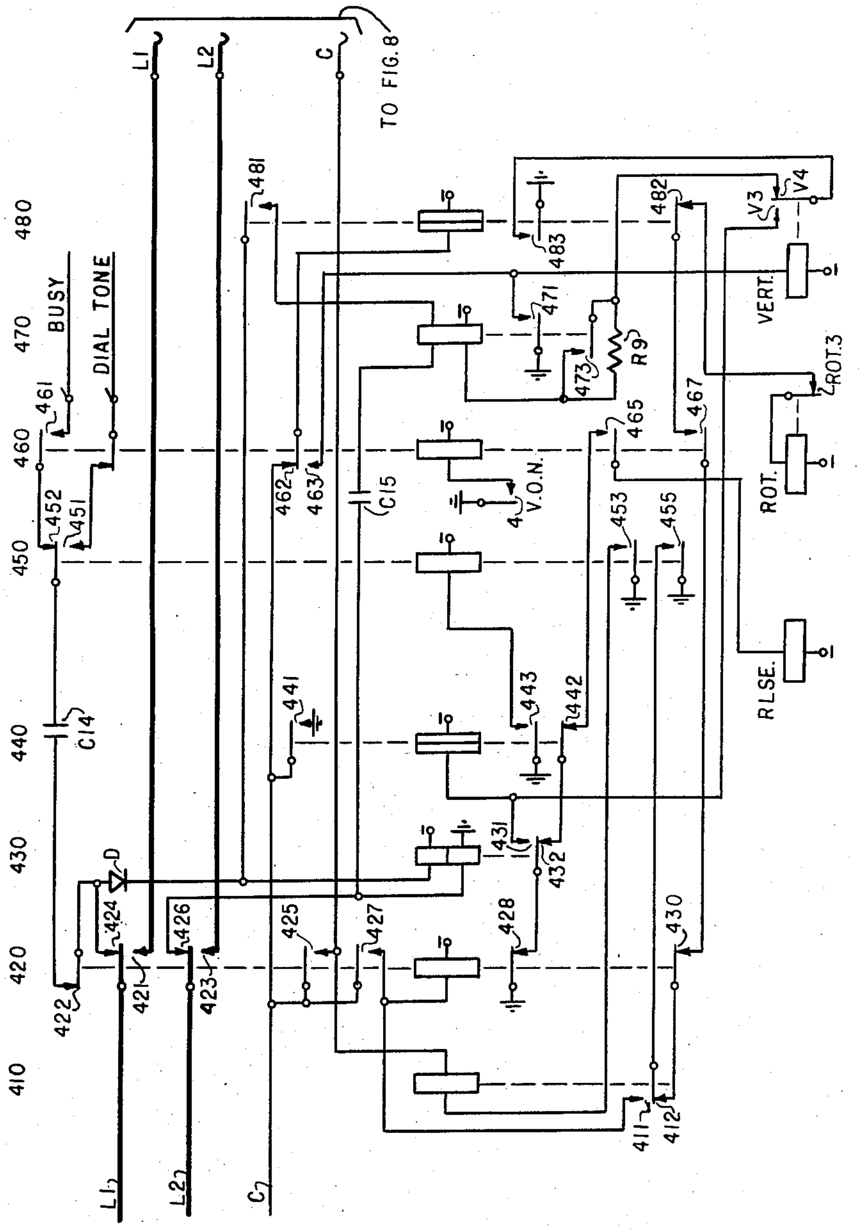
Figure 7 shows a selector which is similar to that shown in Figure 5 except that the present selector is provided with a release relay. This selector can be operated from pulses over a closed circuit or by standard pulses, whichever is necessary.

Figure 11 shows another type of repeater which again has no release relay. Therefore closed circuit pulses to this repeater are necessary. Since this repeater transmits pulses to selectors as shown in Figure 7, closed circuit pulses are possible. The outgoing trunks are bridged with a resistance for that purpose.

*Operation of Office 1*

It will first be assumed that the operation to be described is to be initiated from a standard telephone, the operation of which is well-known in the art.

Figure 3:
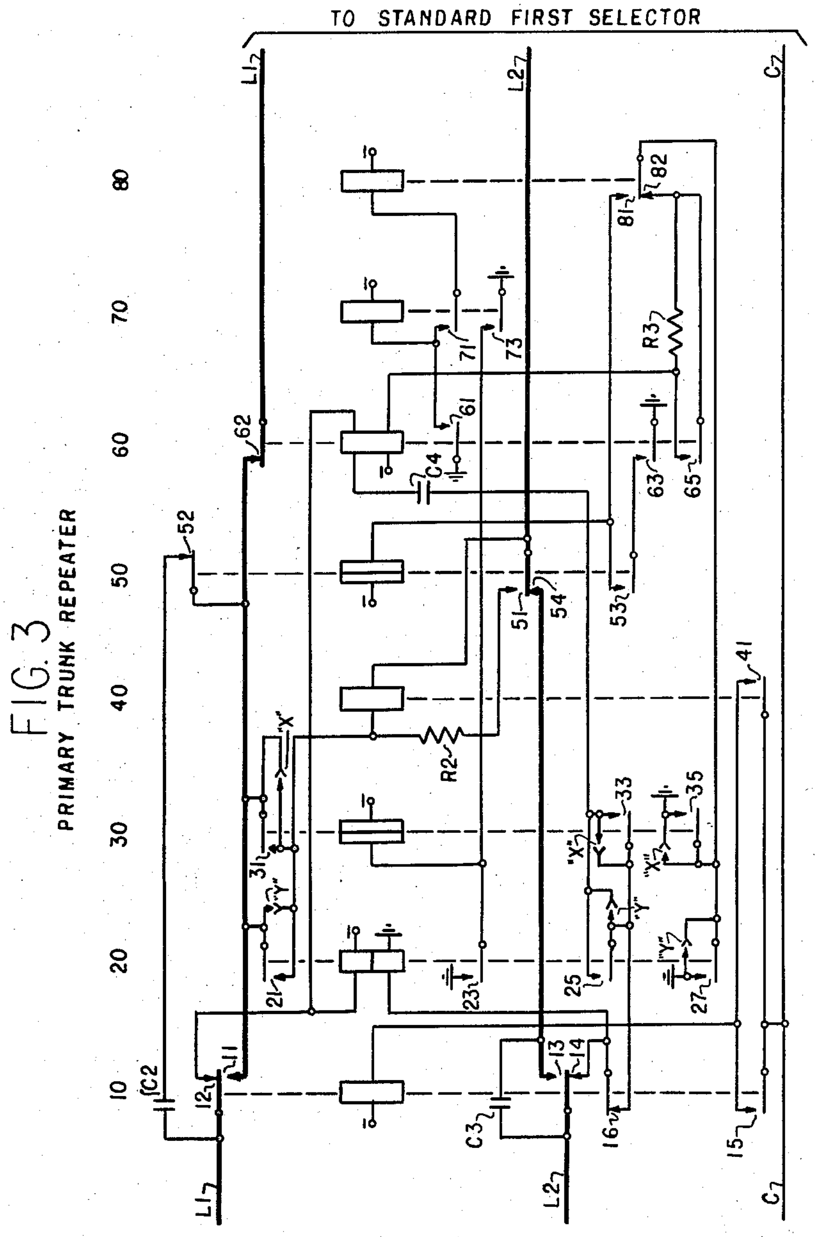

When the calling subscriber lifts his handset a linefinder (circuit not shown) connects the subscriber line to the repeater to at once cause a loop circuit to be closed across the line conductors L1 and L2 of the primary trunk inductive pulse repeater shown in Fig. 3. At the time this loop is closed, the linefinder also grounds the C lead in the repeater. This ground causes the necessary relays in the succeeding first selector (circuit not shown) to operate and return dial tone to the calling subscriber by way of line conductors L1 and L2 and condensers C2 and C3.

As a result of the loop circuit being closed, relay 20 operates and at contact 23, relay 30 is energized. (It should be pointed out at this time, that since a standard telephone is being used and relay 20 will release several times during dialling, relay 30 is required to hold contacts 31, 33 and 35 operated. In this case "X" wiring is to be used and "Y" wiring is to be omitted. The use of the "Y" wiring will subsequently be described.)

Responsive to the operation of relay 30, relay 40 is bridged across the trunk at contact 31. This causes the line relay of the associated first selector to operate. Relay 40 is a polar relay and does not operate at this time.

At contact 33 the inductive pulsing circuit through the upper winding of relay 60 is completed. Condenser C4, however, prevents the operation of relay 60 at his time.

At contact 35 a preenergizing circuit through the lower winding of relay 60 is completed through resistance R3. Relay 60 will thus be fast to operate when current flows through its upper winding.

At this time, the repeater is prepared to receive digital impulses from the dial of the calling substation.

When the dial pulse springs open for the first time, relay 20 releases. The cessation of current flow in the windings of this relay creates an inductive pulse of voltage through the upper winding of relay 60 and condenser C4, thereby causing that relay, which has been preenergized, to operate. At contact 62, the loop circuit through the line relay of the previously mentioned succeeding selector is opened, and that relay restores causing the vertical magnet in the selector to operate in the usual manner.

At contact 61 a circuit is closed to energize relay 70. A holding circuit for relay 50 is partially completed at contact 63 and at contact 65 a holding circuit, in shunt of resistance R3, is completed to relay 60. This last mentioned holding circuit is necessary due to the fact that the inductive pulse received by relay 60 is extremely short. By shunting the resistance R3, the ground at contact 35 will maintain relay 60 operated for a sufficient length of time to allow the complete operation of the vertical magnet in the succeeding selector.

When relay 70 operates from ground at contact 61, relay 80 also operates, over a parallel path to the same ground, by way of contact 71. Contact 73 operates to extend holding ground back to relay 30. Although relay 30 is slow-to-release, the additional ground pulse at contact 73 is additional insurance against the possible release of relay 30 before relay 20 reoperates.

Relay 80, upon operating, completes a circuit from ground at contact 35 to relay 50 by way of contact 81. This same ground is removed from relay 60 at contact 82 and that relay restores.

When relay 50 operates, the incoming and outgoing trunks are prevented from being connected together through condensers C2 and C3 at contacts 52 and 54. Contact 53 completes the previously mentioned holding circuit for relay 50. At contact 51, relay 40 is shunted from the outgoing pulsing circuit through resistance R2. This is done so that, when relay 60 restores and the loop circuit is again closed at contact 62, the line relay in the succeeding selector will operate quickly. This arrangement also allows a small portion of the current flow in the loop circuit to flow through relay 40 so that when relay 50 releases, the coil of relay 40, being interposed in the loop circuit, will not momentarily offer too high a resistance to the line relay in the selector, thereby causing it to release.

The restoration of relay 60 closes the previously mentioned loop circuit to the line relay of the selector at contact 62. Relays 70 and 80 restore when the ground at contact 61 is removed. The holding circuit for relay 50 is opened at contact 63 but relay 50 is slow-to-release and holds operated momentarily. At contact 65, a point in the holding circuit for relay 60 is opened and the shunt on resistance R3 is removed.

The restoration of relay 80 opens the operating circuit for relay 50 at contact 81 and the lower winding of relay 60 is again preenergized from ground at contact 35 through resistance R3.

At this time relay 20 is again operated from the dial pulse springs and at contact 23, the circuit to relay 30 is again closed.

When subsequent pulses are received by this repeater, the above described operation is repeated and those pulses are repeated to the succeding selector. When the succeeding first selector finds an idle connector, subsequent digits are repeated to the selected connector (not shown) in the above described manner.

When the called line has been reached by the connector, ring back tone will be heard by the calling subscriber through condensers C2 and C3 of Figure 3.

If Office 1 is equipped with connectors which reverse battery when the call is answered, polar relay 40 of the primary trunk repeater will operate responsive to this reversal over conductors L1 and L2 and through contact 31 of relay 30. The operation of relay 40 completes a circuit to operate relay 10 from ground on the C lead, through contact 41 to relay 10 and battery.

When relay 10 operates, the condensers C2 and C3 are removed from the talking circuit at contacts 11 and 13. The opening of contacts 12 and 14 causes relay 20 to restore. At contact 16 the operating circuit through the upper winding of relay 60 is opened so that relay 60 will not operate from the inductive surge created when relay 20 restores. Contact 15 completes a locking circuit for relay 10 from ground on the C lead.

The release of relay 20 due to the opening of its operating circuit at contacts 12 and 14, opens contacts 23 to cause relay 30 to release after an interval. At contact 31 the operating circuit for relay 40 is opened and that relay restores. At contact 41, the operating circuit for relay 10 is opened but this is without affect because relay 10 is locked operated by way of contact 15 as above pointed out.

It has been assumed that the connector in Office 1 is of the reverse battery type. If the connector does not reverse battery, polary relay 40 will not operate and condensers C2 and C3 will remain in the talking circuit throughout the ensuing conversation.

At the beginning of the description of the operation of Office 1 it was assumed that a standard telephone substation circuit was being used. The operation of this repeater in response to pulses from the substation shown in Figure 2 will now be described.

When the handset is removed by a subcriber desiring to make a call, the hookswitch closes contacts "X" and "Y." This immediately causes a linefinder (circuit not shown) to search for the calling line. When the calling line is found a circuit is completed to operate relay 20 in the repeater shown in Figure 3. As was described before, dial tone is returned to the calling party through condensers C2 and C3.

When the dial is turned off normal the dial shunt springs are closed and shunt the two lower windings of the induction coil. The upper winding of that coil remains in the pulsing circuit in order to prevent the inductive pulse created by the line relay from being dissipated in the substation circuit. Each time the pulse springs open as the dial restores, R1 is inserted in the holding circuit of relay 20. This reduces the flow of current through relay 20 and the inductive surge which results from this decreased current flow causes relay 60 to operate through its upper winding in the manner previously described.

Although the current flow through relay 20 is reduced, this relay holds its contacts operated. Because of the fact that relay 20 does not release its contacts during pulsing, relay 30 may be omitted. In this case Y wiring only, is used and relay 20 now performs the same functions as relay 30. The repeater inductively repeats the pulses received, to all of the succeeding switches as previously described.

As was above pointed out, the lower two windings of the induction coil of the substation are shunted when the dial is turned off-normal. The upper winding remains in the holding circuit during pulsing. It can readily be seen that a portion of the inductive surge from relay 20 may flow back through the substation circuit over conductors L1 and L2. The impedance of the upper winding of the induction coil, not being shunted during dialling, serves to prevent a quick flow of current through the substation circuit, thereby permitting the inductive surge to be used in operating relay 60.

When the calling subscriber restores his handset, the "X" contacts will break first. In this manner, resistance R1 absorbs a portion of the inductive surge created by the release of the line relay, so that when the "Y" contact opens the current will be low enough to prevent any damage to this contact due to sparkling.

When the "Y" contact opens and "Z" contact closes, the ringer and condenser C1 will be bridged across the line and the substation is prepared for further calls.

*Calls from Office 1 to Office 3*

The operation of the outgoing repeater shown in Figure 4 will now be described. This repeater is used to send inductive pulses from Office 1 to Office 3 and can be used in an office where only standard selectors are used.

Figure 4:
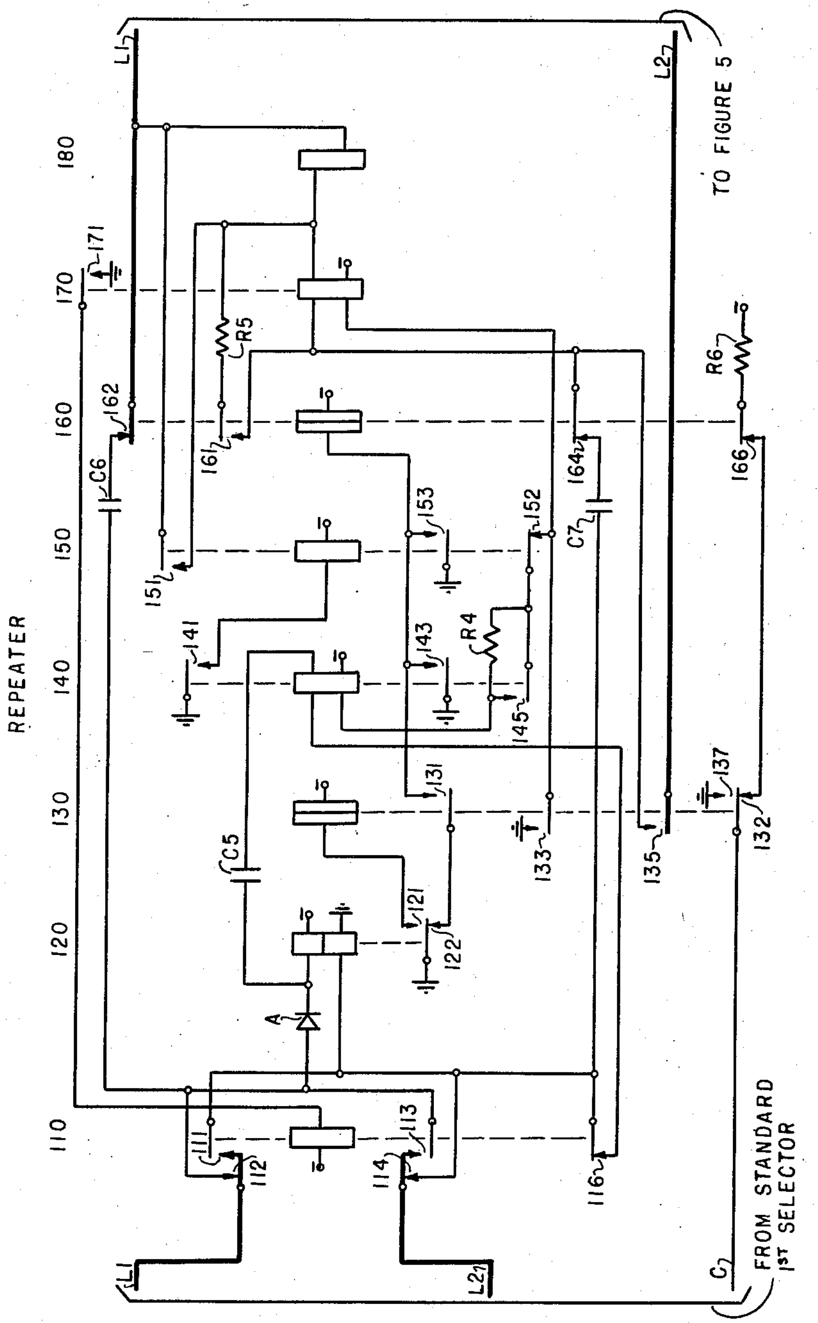
Figure 4 illustrates a second type of repeater, the purpose of which is to repeat pulses to switching equipment which lacks a release relay. Thus, the pulses repeated by this switch are closed circuit pulses only.
Figure 5:
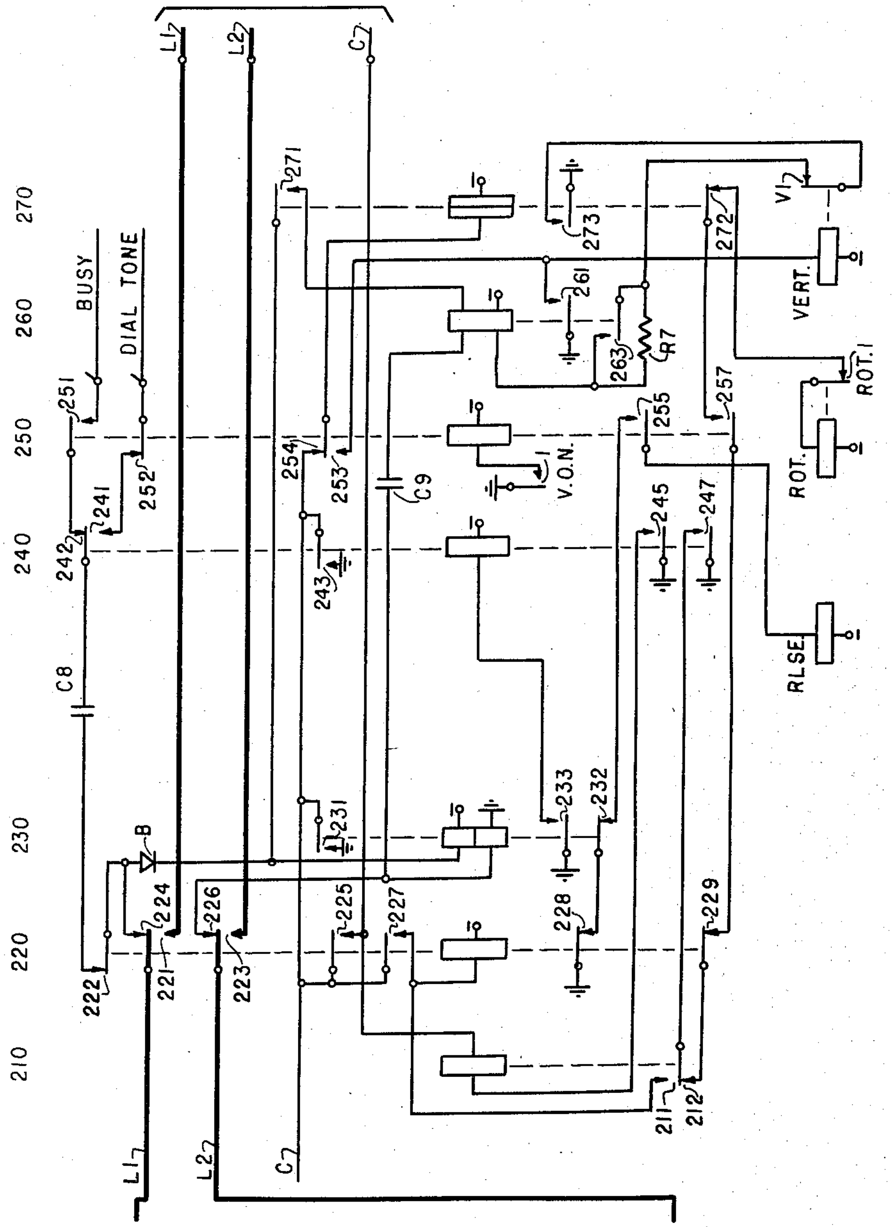
Figure 5 shows a selector which has no release relay. This switch operates only from closed circuit pulses since the line relay is also used as a release relay.

It will be assumed that a subscriber in Office 1 wishes to call a subscriber in Office 3 and that the repeater shown in Figure 4 has been selected by a standard first selector (circuit not shown) to repeat additional dial impulses to the incoming selector shown in Figure 5, which selector is of the type used in Office 3.

When the repeater is seized by the preceding selector, relay 120 operates over the closed loop circuit by way of contacts 112 and 114. At contact 121 a circuit is completed to relay 130 which operates at this time.

At contact 131 the operating circuit for relay 160 is partially completed. A circuit is completed to the lower winding of relay 170 at contact 133 and this relay, being polarized, will not operate over its lower winding only. At contact 133, a circuit is also completed to the lower winding of relay 140. This is a preenergizing circuit only and because of the resistance R4, relay 140 will not operate at this time. At contact 135, relay 170 and impedance 180 are bridged across the conductors L1 and L2. At contact 127 the C lead is grounded to hold all preceding switches operated.

In response to the operation of contact 135, the line relay 230 in the incoming selector (Figure 5) in Office 3 is operated. Relay 240 is then energized from ground at contact 233. The circuit to the release magnet is opened at contact 232. At contact 231 the operating circuit to relay 270 is completed. The operation of relay 240 at contact 242 prevents busy tone from being sent to the calling party at this time. At contact 243 an additional holding ground is provided for relay 270. At contact 245 the outgoing C wiper is grounded through relay 210. The operating circuit for the rotary magnet is partially completed at contact 247.

The operation of relay 270 causes a circuit to be closed through contacts 271 through the upper winding of relay 260 and condenser C9 in preparation for the receipt of inductive pulses from relay 230. No current will flow through relay 260 at this time because of condenser C9. Contact 273 closes a preenergizing circuit through the lower winding of relay 260 through resistance R7 but because of the resistance of R7, relay 260 will not operate over this circuit. At contact 272 the incomplete circuit to the rotary magnet is opened to prevent its operation before the release of relay 270.

It should at this time be pointed out that since Figure 5 in this case is used as an incoming selector, the dial tone lead through contacts 252 and 241 may be omitted. Dial tone was furnished to the calling party by the local selector in Office 1, and is unnecessary at this point. Dial tone is necessary in this selector only when it is used as a local selector. This will be subsequently described in connection with the operation of Office 3.

When the dial springs open in response to the restoration of the dial, the primary trunk repeater opens the circuit to relay 120. Relay 120 is restoring causes an inductive surge through condenser C5 and the upper winding of relay 140. Because it has been preenergized, relay 140 will be quick to operate.

Contact 145 in operating, shunts resistance R4, and relay 140 is momentarily locked to ground at contact 133. (It should be here noted that since relay 130 is slow-to-release, it will remain operated throughout the entire series of pulses received.) At contact 141 a circuit is closed to operate relay 150. At contact 143, an additional ground is extended to relay 160 and battery, this relay being operated when relay 120 restores from ground at contact 122. Since relay 160 is a slow-to-release relay it will remain operated during the entire series of pulses received. Relay 160 in operating opens the trunk at contacts 162 and 164. At contact 161 the upper winding of relay 170 is shunted through resistance R5.

The operation of relay 150 at contact 151 shunts the impedance 180 thereby increasing the current through the line relay 230 of the incoming selector in Office 3. At contact 153 an additional holding ground is provided to hold relay 160 operated. At contact 152 the holding circuit for relay 140 is open and relay 140 will restore.

The restoration of relay 140 opens the operating circuit to relay 150 at contact 141. The opening of contact 143 removes one of the holding grounds from relay 160 but relay 160 will remain operated from the ground at contact 153 of relay 150. At contact 145 the holding circuit for relay 140 is further opened.

Relay 150 in restoring, opens contact 151 thereby removing the shunt from the impedance 180. Impedance 180 again being placed in the holding circuit of the line relay 230, causes the current flow through that relay to decrease. The reduction of the current flow through relay 230 causes an inductive surge of current to flow through the upper winding of relay 260 thereby causing relay 260 to operate. The purpose of rectifier B in the holding circuit of the line relay is to prevent any portion of the inductive surge from flowing back through the incoming trunks when condenser C9 discharges. By means of rectifier B the full voltage created by the inductive surge can be used in the operation of relay 260.

At this time it is to be noted that the pulsing relay 230 will remain operated throughout pulsing. This is due to the fact that impedance 180, which is interposed in the holding circuit of relay 230, only causes a decrease of current flow through that relay. The remaining current flow is still sufficient to hold the contacts of relay 230 operated. Because of this feature, the usual release relay is not necessary in this switch.

The operation of relay 260 closes a circuit to the vertical magnet at contacts 261 and in response to the operation of the vertical magnet the switch wipers of the selector are moved to the first vertical position. At contact 263 a holding circuit is completed through the lower winding of relay 260 to ground at contact 273. This holding circuit shunts the resistance R7 and is sufficient to hold relay 260 operated. When the switch wipers take the first vertical step the vertical off-normal springs close at contact 1, thereby completing a circuit to relay 250. At the completion of the first vertical step the vertical magnet interrupter springs V1, are opened, thereby opening the holding circuit to relay 260 and allowing that relay to restore. In restoring, relay 260 opens its contact 261 which in turn opens the operating circuit to the vertical magnet. At contact 263 the shunt on resistance R7 is removed. When the vertical magnet restores, the interrupter springs V1, again close to restore the preenergizing circuit through the lower winding of relay 260.

The operation of relay 250 partially prepares the busy tone circuit at contact 251, but busy tone is not returned at this time, because relay 240 is still operated and the circuit is incomplete at contact 242. At contact 254 the operating circuit for relay 270 is opened. The operating circuit for relay 270 is then transferred to the ground at contact 261, through contact 253. Relay 270 being slow-to-release, will hold operated while this transfer takes place. At contact 255 the incomplete circuit to the release magnet is partially completed but the release magnet does not yet operate due to the fact that relay 230 is still operated and at contact 232 the circuit to the release magnet is opened. At contact 257 the circuit to the rotary magnet is partially completed but the rotary magnet will not operate until relay 270 restores and completes the operating circuit at its contact 272.

If further impulses are sent to the repeater shown in Figure 4, the operation previously described will be repeated and the pulses will be transmitted to relay 230 of the incoming selector in Figure 5. The inductive surges from relay 230 in response to these incoming pulses will again operate relay 260 and the vertical magnet as before described. It should be pointed out that relay 260 will operate quick enough in response to the additional received impulses to allow the ground at contacts 261 to hold relay 270 operated throughout the full series of pulses.

At the termination of impulses from the calling telephone the switch wipers of the selector will come to rest opposite the dialled vertical bank of contacts and at this time automatic rotary hunting will be initiated in order to select an idle connector.

At the terminal of the dial impulses relay 260 will restore and at contact 261 ground will be removed from relay 270 allowing that relay to restore. Relay 270 in restoring, at its contact 272, completes a circuit for the operation of the rotary magnet to ground at contact 247. In response to the operation of the rotary magnet the switch wipers of the selector will step on to the first rotary contact. The rotary magnet now operating, operates its interrupter contacts ROT1, which open its own operating circuit thereby causing the rotary magnet to restore. If the first rotary contact is busy, ground will be encountered by the C wiper and when the rotary magnet restores its interrupter contact ROT1 again closes the circuit to operate the rotary magnet, thereby causing the switch wipers to move to the second rotary contact. If this contact is idle, battery from relay 340 through the V.O.N. springs 3, in the connector illustrated in Fig. 6 will cause the operation of relay 210 through contacts 245 to ground. The operation of relay 210 transfers, at contact 211, the ground at contact 247 from the rotary magnet to relay 220 which operates at this time. The rotary magnet interrupter springs ROT1, on restoring, will not complete the circuit to the rotary magnet because this circuit is opened at contact 212 of relay 210.

The operation of relay 220, at contact 222, opens the circuit to the busy tone equipment. At contacts 224 and 226 the holding circuit for relay 230 is opened and at contacts 221 and 223 the incoming trunks L1 and L2 are switched through to the outgoing trunks L1 and L2 to thereby operate the line relay 320 in the succeeding connector. At contacts 225 and 227 a partial circuit is completed for holding relay 220 operated. These contacts also serve to shunt relay 210, thereby allowing it to restore. At contact 228 the circuit to the release magnet is opened so that the release magnet will not operate until relay 220 restores at the end of the conversation. Contact 229 opens the circuit to the rotary magnet to prevent the rotary magnet from operating in case relay 210 should restore before ground is removed at contact 247.

The restoration of relay 230 causes one ground to be removed from the C lead at contact 231. At contact 233 the circuit to relay 240 is opened and relay 240 will restore. At contact 232 the incomplete circuit to the release magnet is partially completed still remaining open however, at contact 228 of relay 220.

The restoration of relay 240, partially completes the circuit for the return of busy tone to the calling party at contact 242, busy tone however will not be returned to the calling party because this circuit is opened at contact 222 of relay 220. At contact 243 an additional ground on the C lead is removed. At contact 245 the operating ground is removed from relay 210 thereby preventing the further operation of that relay. At contact 247 the operating ground for the rotary magnet is removed thereby preventing any further rotary movement of the switch wipers.

The operating circuit to relay 250 will not be opened until the switch wipers return to normal and the vertical off-normal springs V.O.N. 1 are again operated. Therefore relay 250 will remain operated throughout the conversation. At contact 255 of relay 250 the operating circuit for the release magnet is prepared so that when relay 220 restores the release magnet will operate and restore the switch wipers to normal, thereby causing the operation of the vertical off-normal springs V.O.N. 1, to allow relay 250 to restore.

It should at this time be pointed out that when relay 210 restores, the operating ground for relay 220 is removed at contact 211. However, before this ground is removed at contact 211, the opeartion of relay 320 in the connector, causes ground to be returned at contact 323 by means of the C wiper to hold relay 220 operated. This ground at contact 323 will be returned over the C lead before the release of 210, thereby preventing the restoration of relay 220. At contact 321 of relay 320 the C wiper of the connector is grounded through relay 330. At contact 325 a circuit is prepared for the operation of relay 380 through its lower winding. The ground at contact 325 also serves to complete a preenergizing circuit through the lower winding of relay 330 through resistance R8. This preenergizing circuit will cause relay 330 to be fast to operate.

As was previously pointed out, the operation of relay 210 in the preceding selector was caused when battery was returned over the C lead from the upper winding of relay 340 through the vertical off-normal springs 3. Relay 340 operated at this time and when relay 320 operated, a holding ground was provided at contact 323 to hold relay 340 operated so this relay would not release when ground was removed at contact 245 of relay 240 in the selector. Relay 340 in operating prepared the operating circuit for the vertical magnet at contact 341. At this point the connector is prepared to receive further dial impulses.

When the next digit is dialled, impedance 180 is shunted and there is an increase of current flow through relay 320, and when this shunt is removed by the release of relay 150 at contact 151, the current through relay 320 is decreased creating an inductive surge through the upper winding of relay 330 through contact 382 and contact 364, and back through the lower winding of relay 320. The reduction of current through relay 320 does not allow relay 320 to restore its contacts, therefore it can be seen that the contacts of relay 320 remain operated throughout pulsing so that the usual release relay is not necessary in this connector. The rectifier C serves the same purpose as that previously described in the operation of the selector. This rectifier prevents any portion of the inductive surge created by the reduction of current flow through relay 320 from flowing back through the holding circuit for relay 320 thereby allowing the full effect of the inductive surge to be used in the operation of relay 330 through its upper winding.

As was previously pointed out, relay 330 has been preenergized over its lower winding. This causes relay 330 to operate very quickly when current is received through its upper winding in response to the inductive surge of relay 320. Relay 330, in operating, causes the vertical magnet to operate from ground at contact 331 through operated contact 341 to the vertical magnet and battery. The vertical magnet in operating will then move the switch wipers to the first vertical position. At contact 333, resistance R8 is shunted and a holding circuit is completed through the lower winding of relay 330 to hold this relay operated till the first full vertical step is taken. When the vertical magnet is completely operated, its interrupter contacts V2 are opened, thereby opening the holding circuit for relay 330 and allowing that relay to restore. Also at this time, the vertical off-normal springs operate on the first vertical step thereby opening the operating circuit through the upper winding of relay 340 at V.O.N. 3. V.O.N. 2 prepares the operating circuit for the release magnet, but the release magnet will not operate until relay 320 restores to complete the operating circuit to the release magnet at contact 322. It should be pointed out with reference relay 340, that when the vertical off-normal springs operate at V.O.N. 3, relay 340 will not restore because it is maintained operated through its lower winding to ground at contact 331 of relay 330. Relay 340 being slow-to-release, will remain operated throughout the series of pulses to the vertical magnet.

When the vertical magnet interrupter springs V2 are opened, relay 330 will restore and the operating circuit to the vertical magnet is opened at contact 331. At contact 333 the holding circuit through the lower winding of relay 330 is opened as the shunt around resistance R8 is removed. In response to the restoration of the vertical magnet the vertical magnet interrupter springs V2 again close to complete the preenergizing circuit through the lower winding of relay 330 through resistance R8. When the second and subsequent pulses are received, the above described operation will be repeated.

At the termination of the first series of impulses received by the connector, relay 340 will restore due to the fact that its holding circuit is opened at contact 331. At contact 341 the operating circuit for the vertical magnet is opened and at contact 342 the operating circuits for the rotary magnet and for relay 370 are prepared.

Upon receipt of the next series of impulses relay 330 operates, in response to the inductive surge through its upper winding created by relay 320, and at contact 331 the operating circuits are completed for the rotary magnet and for relay 370. The rotary magnet upon operating, causes the switch wipers to move onto the first rotary contact. When the rotary magnet is fully operated, the rotary magnet interrupter springs ROT2, open the circuit to relay 330 allowing that relay to restore its contacts. At contact 331 the circuit to the rotary magnet is opened and the rotary magnet will restore thereby restoring its interrupter contact and closing the preenergizing circuit through the lower winding of relay 330. It should be noted that relay 370, being a slow-to-release relay, will remain operated during the entire series of pulses. The operation of relay 370 connects the C wiper to relay 360 through contact 371. At contact 373 a parallel path for the flow of current through the upper winding of relay 330 is closed. This is necessary in view of the fact that the switch wipers may pass over busy grounded contacts, thereby operating relay 360 and opening the pulsing circuit at contact 364. The rotary magnet continues to operate in the manner previously described for each subsequent pulse received by the connector.

At the termination of the impulses of the final digit the switch wipers come to rest on the contacts of the called party. Relay 330 in restoring at the end of this series of impulses causes the ground to be removed from relay 370 at contact 331. If the called line is busy, ground will be returned over the C wiper to operate relay 360. This relay now operating closes the circuit to the busy tone equipment at contact 361. At contact 363 a locking circuit is prepared for relay 360, to ground at contact 321. When relay 370 restores, relay 360 remains operated through contacts 374 and 363 to ground at contact 321. The calling subscriber will then receive busy tone.

If the contact upon which the switch wipers come to rest is idle, battery will be returned over the C wiper through contact 372, through the upper winding of relay 380, and through unoperated contact 362 to ground at contact 321. Relay 380 being energized over its upper winding will close the "X" contacts at 389 only. The closure of this contact completes the circuit through the lower winding of relay 380 to ground at contact 325. At this time relay 380 will operate completely. At contact 381 a circuit is completed for the return of ring back tone to the calling party. At contacts 383 and 385 a circuit for the ringing equipment is completed and ringing will begin over the following circuit: from battery connected generator through the lower winding of relay 350, through unoperated contact 352, through contact 383, over conductor L1 through the ringing equipment in the called party's substation circuit, back over conductor L2 through contacts 385 and 356 to ground. Ringing will then continue until the called subscriber lifts his handset at which time a direct current circuit is completed over the above traced path. At contact 387 ground is extended over the C wiper to mark this line busy to all other calls. At contact 382 the operating path for relay 330 is opened so that no further pulsing is possible. At contact 384 the incomplete circuit to the release magnet is opened.

As previously described when the called subscriber lifts his handset, a direct current is closed through the lower winding of relay 350. This will cause relay 350 to operate its "X" contacts at 355 only. This completes a circuit through the upper winding of relay 355 to ground at contact 387. Relay 350 will then operate completely and at contacts 351 and 353, relay 310 is operated. Conversation may now take place through condensers C10 and C11. Relay 310 in operating reverses the connection of relay 320 to the incoming line to reverse battery thereover. It will be remembered that in the discussion of the repeater illustrated in Fig. 4 it was there pointed out that relay 170 was a polarized relay and would not operate in the holding circuit for relay 230 of the selector shown in Figure 5. Upon the reversal of battery over the trunk in the connector however, relay 170 in Figure 4 will now operate through its upper winding thereby closing its contact 171. The ground at contact 171 completes a circuit for the operation of relay 110 in the repeater. This relay will then operate to reverse the connections of relay 120 to the calling line. By reversing the battery of relay 120, polar relay 40 in the primary trunk repeater illustrated in Figure 3 will also operate. Relay 40 in operating completes a circuit to relay 10 at contact 41 to ground on the C lead. The operation of relay 10 opens contacts 12 and 14 to cause relay 20 to restore. At contacts 11 and 13 the incoming trunks L1 and L2 are switched through to the outgoing trunks exclusive of condensers C2 and C3.

If, at the termination of conversation, the calling party first restores his handset, relay 120 in the repeater shown in Figure 4 will restore. The restoration of this relay, will cause relay 130 to restore at contact 121. Relay 130 in restoring, removes ground from the C lead at contact 137 to release all preceding switches. In this case the preceding switch would be the standard selector (circuit not shown) in Office 1. At contact 133 ground is removed from the lower winding of relay 170. This relay however remains operated through its upper winding. At contact 131 the operating circuit for relay 160 is opened and that relay restores. In this connection it is to be noted that relay 120 restores before relay 130, and at contact 122 a circuit is completed through contact 131 to operate relay 160. At contact 166 battery potential is momentarily removed from the C lead to prevent the seizure of this repeater. When relay 160 restores, battery potential is returned to the C lead thus preparing this repeater for further use. At contact 135 the holding circuit for relay 320 in the connector is opened. As a result of this, relay 170 restores and at contact 171 the operating circuit for relay 110 is opened and that relay will restore. The restoration of relay 110 reverses battery to normal.

As before pointed out, the release of relay 130 in the repeater shown in Figure 4 opens the holding circuit for relay 320 in the connector at contact 135. At contact 323 ground is removed from the C lead thereby allowing relay 220 in the preceding selector to restore. At contact 322 the operating circuit for the release magnet is prepared and will operate when relay 380 restores its contacts at 384. At contact 325 the holding circuit for relay 380 is opened and relay 380 will restore at this time. At contact 387 the holding ground for relay 350 is removed and relay 350 will restore. Ground at 325 also opens the preenergizing circuit through the lower winding of relay 330. The restoration of relay 350 at contacts 351 and 353 causes relay 310 to restore. At contact 355 the holding circuit through the upper winding of relay 350 is opened. Relay 310 in restoring causes the trunks to be reversed to normal. The restoration of relay 380 removes ground from the C wiper thus making this connector available for seizure for additional calls. At contact 384 a circuit to the release magnet is completed from ground at 322 through V.O.N. 2.

In response to the operation of the release magnet the switch wipers of the connector will return to normal thereby causing the V.O.N. springs to restore. At V.O.N. 2, the operating circuit to the release magnet is opened and the release magnet restores.

As previously mentioned, when relay 320 restored, ground was removed from the C lead at contact 323 and caused relay 220 in the selector shown in Figure 5 to restore. In restoring, relay 220 again connects the incoming trunks L1 and L2 to relay 230 at contacts 224 and 226. At contact 228 the operating circuit to the release magnet is completed and the switch wipers of the selector return to normal. Upon the return of the wipers to normal the V.O.N. springs restore and at V.O.N. 1, the operating circuit for relay 250 is opened and relay 250 restores. Relay 250 in restoring its contact 255, opens the operating circuit to the release magnet and this magnet restores. The selector is now prepared for further seizure.

*Calls from Office 1 to Office 2*

When a subscriber in Office 1 dials a subscriber in Office 2 the dial impulses are repeated by the primary trunk repeater shown in Fig. 3 to the standard repeater (circuit not shown) in Office 1, which standard repeater repeats the pulses, sending them on to the incoming selector of Office 2. This incoming selector is illustrated in Figure 7.

It will readily be seen that the selector shown in Figure 7 is very similar to the selector shown in Figure 5. The only difference between these two selectors is that the selector shown in Figure 7 is equipped with a release relay 440, while the selector shown in Figure 5 does not have such a relay. This holding relay is necessary in Figure 7 because the impulses received by this selector are received from a standard repeater which opens and closes the holding circuit of the line relay 430 in the selector. It will be remembered that in the previous description of Figure 5 it was pointed out that the line relay also serves as a release relay. This was possible because the line relay did not release during pulsing. This was due to the fact that the pulsing of the selector was accomplished by decreasing the flow of current through the line relay without allowing that relay to restore its contacts. In the case of Figure 7 however, the pulses are received from a standard repeater. This repeater opens the circuit to the line relay and allows it to fully restore on the receipt of each pulse thereby making a release relay, such as relay 440, necessary for proper operation.

Figure 6:
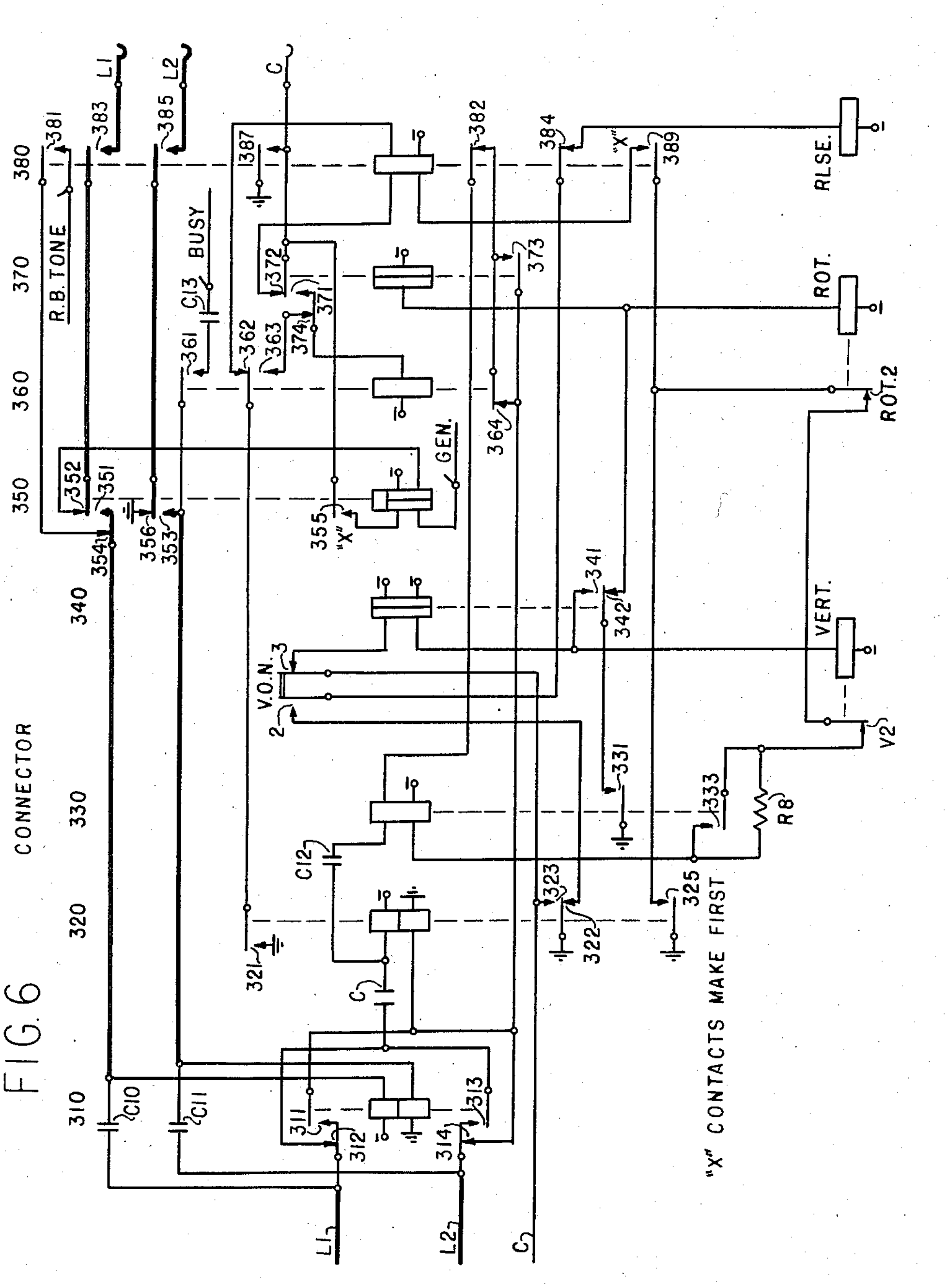
Figure 6 illustrates a connector which also has no release relay thereby making this switch operable only by closed circuit pulses.
Figure 8:
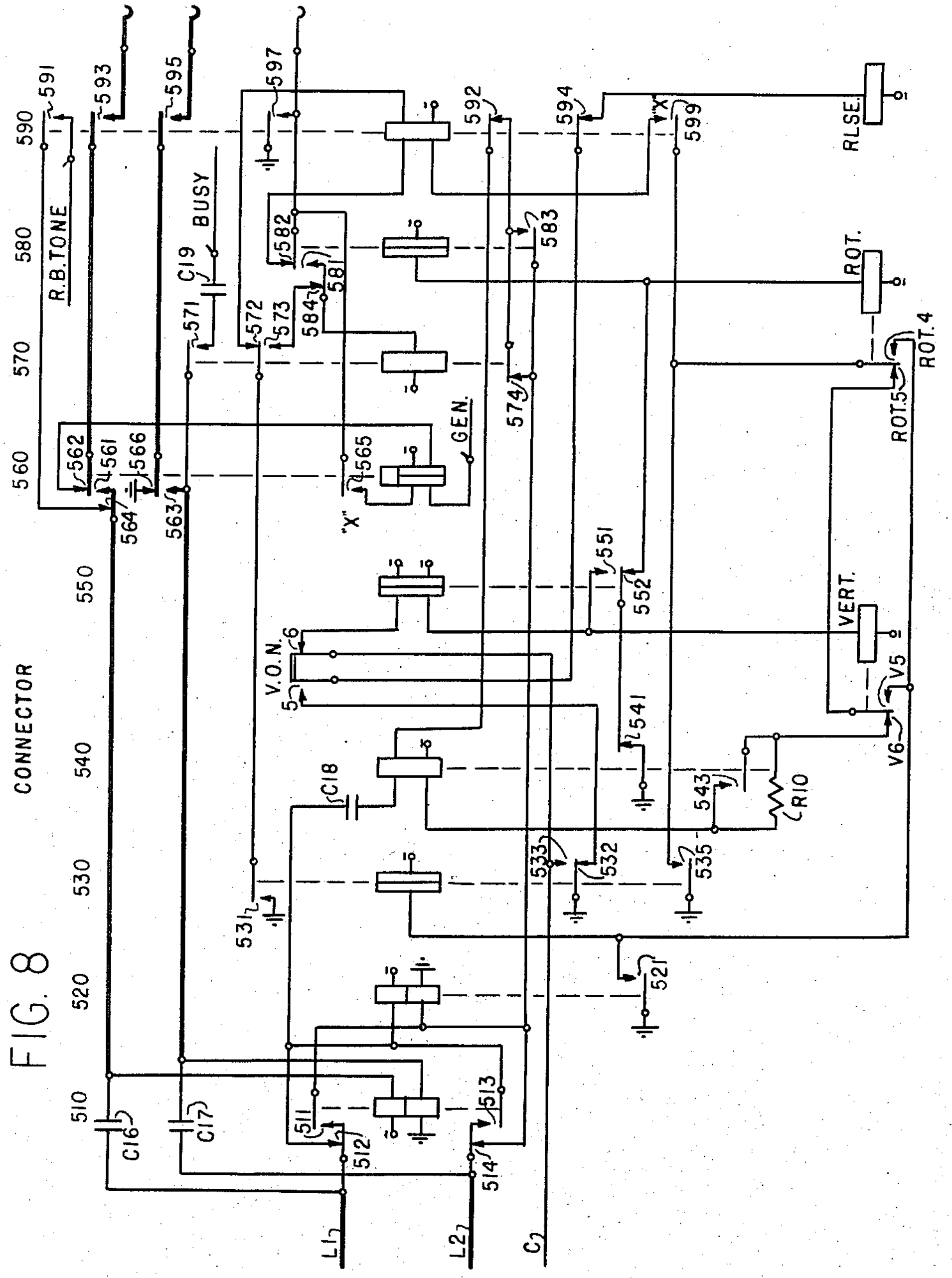
Figure 8 illustrates a connector which is similar to the connector shown in Figure 6 except that a release relay has been provided thereby making this switch operative from either standard pulses or from closed circuit pulses.

With reference to Figure 8, which shows the connector used in Office 2, it will be seen that this connector is very similar to the connector shown in Figure 6. The only difference between these connectors, as in the case of the selectors, is that a holding relay 530 is provided in Figure 8. No such relay is necessary for the operation of Figure 6. Again, this is due to the fact that the connector shown in Figure 8 is to receive pulses from a standard repeater which opens and closes a holding circuit for the line relay 520 thereby allowing that relay to restore its contacts. In view of the preceding detailed description of the selector and connector shown in Figures 5 and 6 respectively, only a general operation will be given for the Figures 7 and 8 to point out the difference in operation due to the addition of the release relays in the selector and the connector.

When the line relay 430 of the selector is seized it will operate its contacts and at 431 a circuit will be closed to operate relay 440. Relay 440 will close a circuit to operate relay 480 at contact 441. At contact 443 a circuit will be closed to operate relay 450. The operation of relay 480 closes a preenergizing circuit through the pulsing relay 470 as before described. At this time the selector is prepared for pulsing. Upon the first opening of the holding circuit for line relay 430, that relay will become deenergized and will cause an inductive pulse of current to flow through the upper winding of relay 470. At contact 432 the ground is removed from relay 440 but this relay being slow-to-release will remain operated during pulsing. The operation of relay 470, at contact 471 will complete the operating circuit for the vertical magnet which operates at this time to move the switch wipers of the selector one vertical step. Relay 470 prepares a holding circuit for itself at contacts 473. This is necessary because the inductive pulse through the upper winding of relay 470 is very quick and may allow relay 470 to restore, thereby preventing the vertical magnet from taking a full step. Upon the complete operation of the vertical magnet the holding circuit through the lower winding of relay 470 is opened at the vertical magnet interrupter springs, V4. Vertical magnet interrupter springs V3 close and return the ground at contact 483 to relay 440 to hold that relay operated. Although this may not be necessary, it is provided as a means of insuring the continued operation of relay 440 throughout pulsing. By the use of the vertical magnet interrupter springs V4, it can be seen that the vertical magnet will not restore before it has taken a full step. This is due to the fact that V4 controls the holding circuit for relay 470 and the vertical magnet will not restore until relay 470 restores at contacts 471. As further impulses are received the above described operation is repeated until the desired level is reached. At that time the switch wipers will automatically hunt for an idle connector such as the connector shown in Figure 8. This operation, having been before set out in the description of Figure 5, will not be repeated at this time.

When the line relay 520 of the connector shown in Figure 8 is seized, that relay will operate. At contact 521 release relay 530 will be energized. Relay 550 was operated on seizure from the ground on the C lead through contact 6 of the V.O.N. springs, and at contact 551 the operating circuit for the vertical magnet is prepared. When the standard repeater in Office 1 opens the holding circuit for line relay 520 that relay will restore and in restoring will cause an inductive surge of current through condenser C18 and the upper winding of relay 540. This relay will be quick to operate because it has been preenergized through resistance R10 to ground at contact 535 of relay 530. The vertical magnet in operating will move the switch wipers to the first vertical position and upon its full energization will cause the operation of the vertical magnet interrupter springs V5. As described in the operation of the selector in Figure 7, ground from contact 535 will be returned to hold relay 530 operated throughout pulsing. At vertical magnet interrupter contact V6 the holding circuit for relay 540 is opened and that relay will restore. At contact 541 the operating circuit for the vertical magnet is opened and the vertical magnet will restore, at which time the switch is ready to receive the next pulse.

When the switch wipers of the connector reach the desired level in response to the received impulses, relay 550 will restore and at contact 552 the operating circuit for the rotary magnet will be prepared. Upon the receipt of the next pulse relay 540 will again operate and, at contact 541 the operating circuit for rotary magnet will be closed, causing the switch wipers to take the first rotary step, and as in the case of the vertical magnet, the rotary magnet interrupter springs ROT4, will cause the ground at contact 535 to be returned to relay 530 to hold that relay operated. The opening of contact ROT5 opens the holding circuit to the lower winding of relay 540 allowing relay 540 to restore. At contact 541 the operating circuit for rotary magnet is opened and the rotary magnet will restore. Further pulses received from the standard repeater will cause the rotary magnet to step the switch wipers to the desired contact, at which time the operation of this connector will be the same as that described in the operation of the connector shown in Figure 6.

*Operation of Office 2*

When a subscriber in Office 2 desires to call another subscriber in Office 2, the selector and connector shown in Figure 7 and Figure 8 respectively, are used. Since standard telephones are being used in Office 2 and the dial springs are not shunted with a resistance it is necessary that the selectors and the connectors have a holding relay. This is necessary because the standard telephone will open the holding circuit of the line relays of the switches to be pulsed, thereby causing the contacts of these relays to restore. The operation within Office 2 from a standard telephone is exactly the same as the operation of Office 2 when a call is initiated by a subscriber in Office 1 through a standard repeater in Office 1. This operation has been previously described under the title of "Calls from Office 1 to Office 2." A standard repeater in Office 1 and a standard telephone in Office 2 both cause the contacts of the line relays of the selector and connector respectively, to release during pulsing, therefore no difference in the operation of these switches results.

*Calls from Office 2 to Office 1*

When a call is made from Office 2 to Office 1 it is necessary that the repeater in Office 2 be capable of receiving impulses from a standard telephone and at the same time it is necessary that the outgoing repeater in Office 2 send open and close pulses to the outgoing trunk to allow the line relay of the incoming selector (circuit not shown) in Office 1 to restore its contacts. The repeated shown in Figure 9 has these characteristics and at the same time repeats the pulses inductively to the incoming selector and connector of Office 1.

When a subscriber in Office 2 lifts his handset the linefinder in that office will immediately be seized and will begin to hunt for the calling line. At the same time the selector associated with the linefinder will immediately be seized so that when the calling line is found, dialling may begin immediately. The selectors of Office 2 are all of the kind shown in Figure 7. The operation of this selector has previously been set out in detail and will not be repeated at this time. When the first digit is dialled a selector will move its wipers to the predetermined level and will at that time automatically hunt for an idle repeater of the kind shown in Figure 9.

Figure 9:
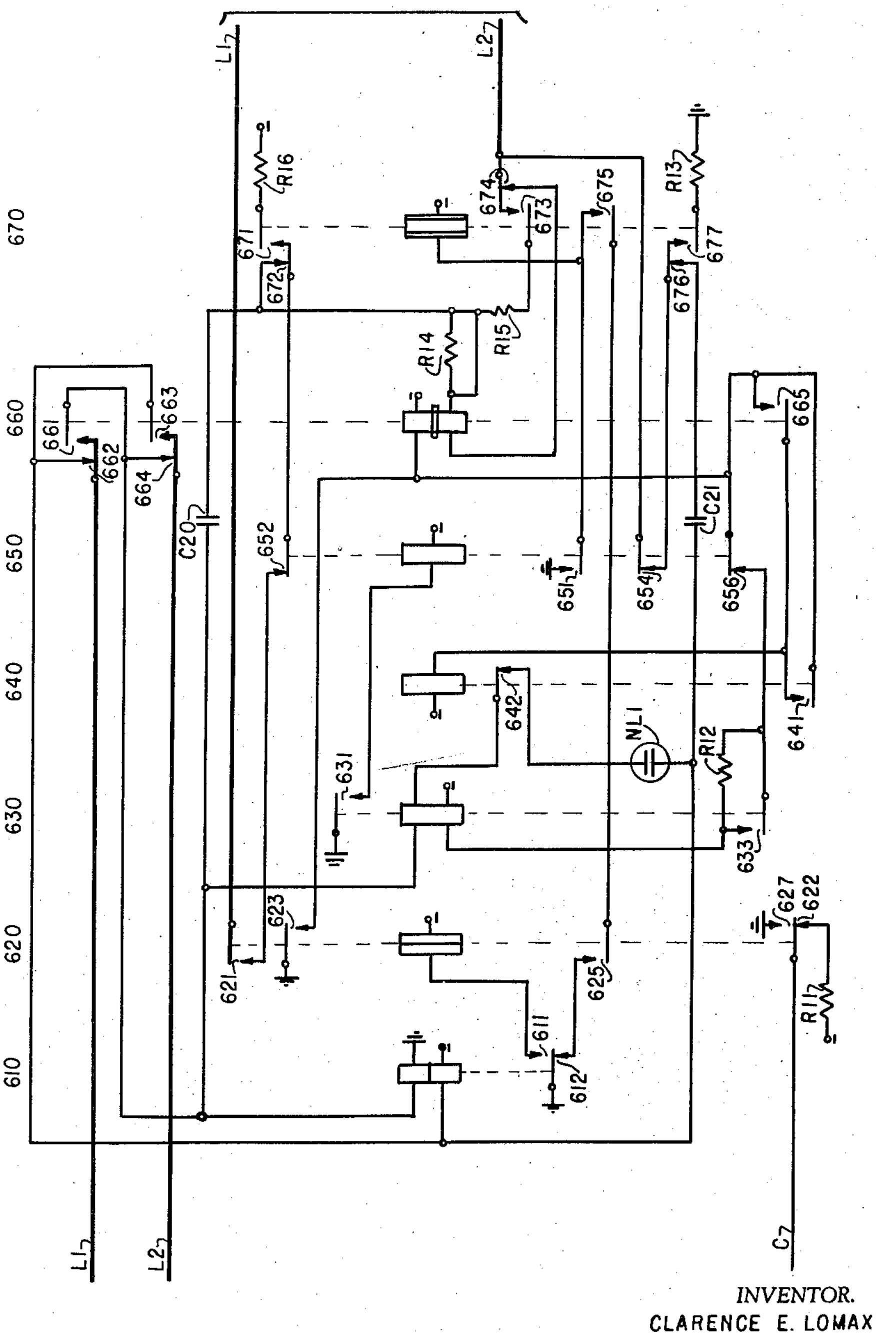
Figure 9 shows a repeater which is provided with a release relay and is operative from standard or closed circuit pulses. Since this repeater is used to repeat pulses to standard switches, the outgoing trunks must be opened for each pulse.

When a repeater such as that shown in Figure 9 is idle, battery potential may be found on the C contact of the control bank of the selector switch. This battery potential originates in the repeater through resistance R11 and contact 622. When the C wiper of the preceding selector encounters battery potential, relay 410 in the selector operates and at contact 411 relay 420 is operated. The operation of relay 420 switches through the talking conductors at which time the line relay 610 of the repeater is operated. The operation of relay 610 completes a circuit to operate relay 620 at contact 611. At contact 621 the outgoing trunks L1 and L2 are closed through the lower winding of relay 660. At this time, the line relay in the incoming selector in Office 1 is seized and will operate. However, relay 660 does not operate through its lower winding only and does not operate and this time. As is shown in the drawing, a shunt on resistance R14 is provided, but this shunt is unnecessary if the trunks between Office 1 and Office 2 are of low resistance. At contact 623 a circuit is completed through the upper winding of relay 660, but relay 660 will still not operate because the current through both the windings are now in opposition. The ground at contact 623 also completes a preenergizing circuit through the lower winding of relay 630. The resistance of R12 in the circuit prevents sufficient current from flowing through the lower winding of relay 630 to operate it. At contact 625 the holding circuit for relay 670 is partially prepared. At contact 627 ground potential is placed on the C lead to hold all preceding switches operated. At this time the repeater is prepared to receive impulses from the calling telephone.

The opening of the dial springs opens the holding circuit to line relay 610 and this relay will restore. At contact 612 the holding circuit for relay 670 is further prepared. The deenergization of relay 610 causes an inductive surge of current to flow through the upper winding of relay 630 and through neon lamp NL1. Relay 630 having been preenergized through its lower winding will be fast to operate and at contact 631 a circuit is completed to relay 650. At contact 633 a holding circuit through the lower winding of relay 30, shunting resistance R12, is completed to ground at contact 623. In connection with the operating circuit through the upper winding of relay 630 it is to be noted that a neon lamp is used rather than a condenser. A condenser would have resulted in a slight transmission lost to ring back tone. However, this would have been removed later to cause no loss in voice transmission. Since a neon tube requires a fairly high voltage to ionize it, it is less likely to let the talking condenser affect the operation of relay 630 than would a condenser.

The operation of relay 650 opens the outging trunks L1 and L2 at contacts 652 and 654. At contact 651 the operating circuit is completed to relay 670 and this relay operates at this time. The holding circuit through the lower winding of relay 630 is opened at contact 656 and relay 630 will restore. When the outgoing trunks L1 and L2 are opened at contacts 652 and 654 the line relay of the incoming selector in Office 1 will restore thereby causing the switch wipers to take the first vertical step.

The operation of relay 670 prepares a circuit to apply reverse potential to the trunks L1 and L2 when relay 650 restores at contact 652. At contact 675 relay 670 prepares a holding path through contacts 675 and 625, to ground at contact 612. This allows relay 670 to get a ground pulse when relay 610 restores during pulsing.

The restoration of relay 630, when contact 631 is opened, causes ground to be removed from relay 650 thereby allowing that relay to restore. At contact 633 the holding ground through the lower winding of relay 630 is opened.

The restoration of relay 650 at contacts 652 and 654 completes the circuit for applying reversed potential to the trunks L1 and L2. This circuit may be traced from battery through resistance R16, contact 671, contacts 652 and 621, out over the trunk L1, to the line relay of the incoming selector, back over line conductor L2, contact 654, operated contact 677, to resistance R13 and ground. This potential is now needed because the second pulse is soon to be sent and if the trunks are of high resistance, the distant line relay of the standard selector in Office 1 would not respond quickly to the dial impulses. At contact 651 the operating circuit for relay 70 is opened and at contact 656 the preenergizing circuit for relay 630 is again completed from ground at contact 623.

As other impulses are received, the above described operation is repeated. It will be noted that relay 670 will hold hold operated throughout a series of pulses but that at the end of each digit relay 670 will restore. When the desired party has been reached and lifts his handset, the incoming conductors will be reversed in the connector and the current flow through the lower winding of relay 660 will no longer be in opposition to the flow of current through the upper winding of relay 660 and that relay will operate. Relay 660 in operating, reverses battery to the calling line at contacts 661 and 663 and at contact 665 the operating circuit for relay 640 it closed.

The operation of relay 640 prevents any further pulsing of this repeater when contact 642 is opened. At contact 641 a holding circuit is completed for the operation of relay 640, so that relay 640 will not release when the called party hangs up, and allow further pulsing through contact 642.

If the called party restores his handset first, the incoming conductors in the connector will be reversed to normal, thereby causing the current through the lower winding 660 in the repeater to be in opposition to the flow of current through the upper winding in said relay. Relay 660 will then restore, reversing the trunks to normal at contacts 662 and 664. The switches in Office 2 will then remain operated until the calling party restores his handset.

If the calling party should restore before the called party has hung up, relay 610 will restore and at contact 611 the operating circuit for relay 620 will be opened and relay 620 will restore. The restoration of relay 620 at contact 623 will open the circuit to relay 640 and relay 640 will restore. When relay 620 restores battery potential is returned to the C lead through contact 622. At this time the repeater is prepared for further calls.

*Calls from Office 2 to Office 3*

When a subscriber in Office 2 desires to call a subscriber in Office 3 and removes his handset, a linefinder will immediately be seized and will start to hunt for the calling line. At the same time, the selector associated with the line finder will be seized so that when the calling line is found the selector will be prepared for dialling. As previously pointed out, the selectors in Office 2 are all of the type shown in Figure 7 and a detailed operation of that selector has been heretofore described. The outgoing reepater shown in Figure 4 is used in transmitting pulses from Office 2 to Office 3 and since the operation of the repeater shown in Figure 4 has already been described its operation will not be repeated at this time.

It will be noted that the repeater shown in Figure 4 is used as an outgoing repeater from Office 1 to Office 3 and also is the outgoing repeater from Office 2 to Office 3. This is possible because in the case of both Office 1 and Office 2 the repeater reecives its impulses from the preceding equipment in response to the opening of the holding circuit for the line relay in the repeater.

The repeater shown in Figure 4 repeats the pulses received from the calling subscriber's dial to the selector shown in Figure 5 and to the connector shown in Figure 6. This operation has previously been described in the description of "Calls from Office 1 to Office 3."

*Operation of Office 3*

Figure 1:
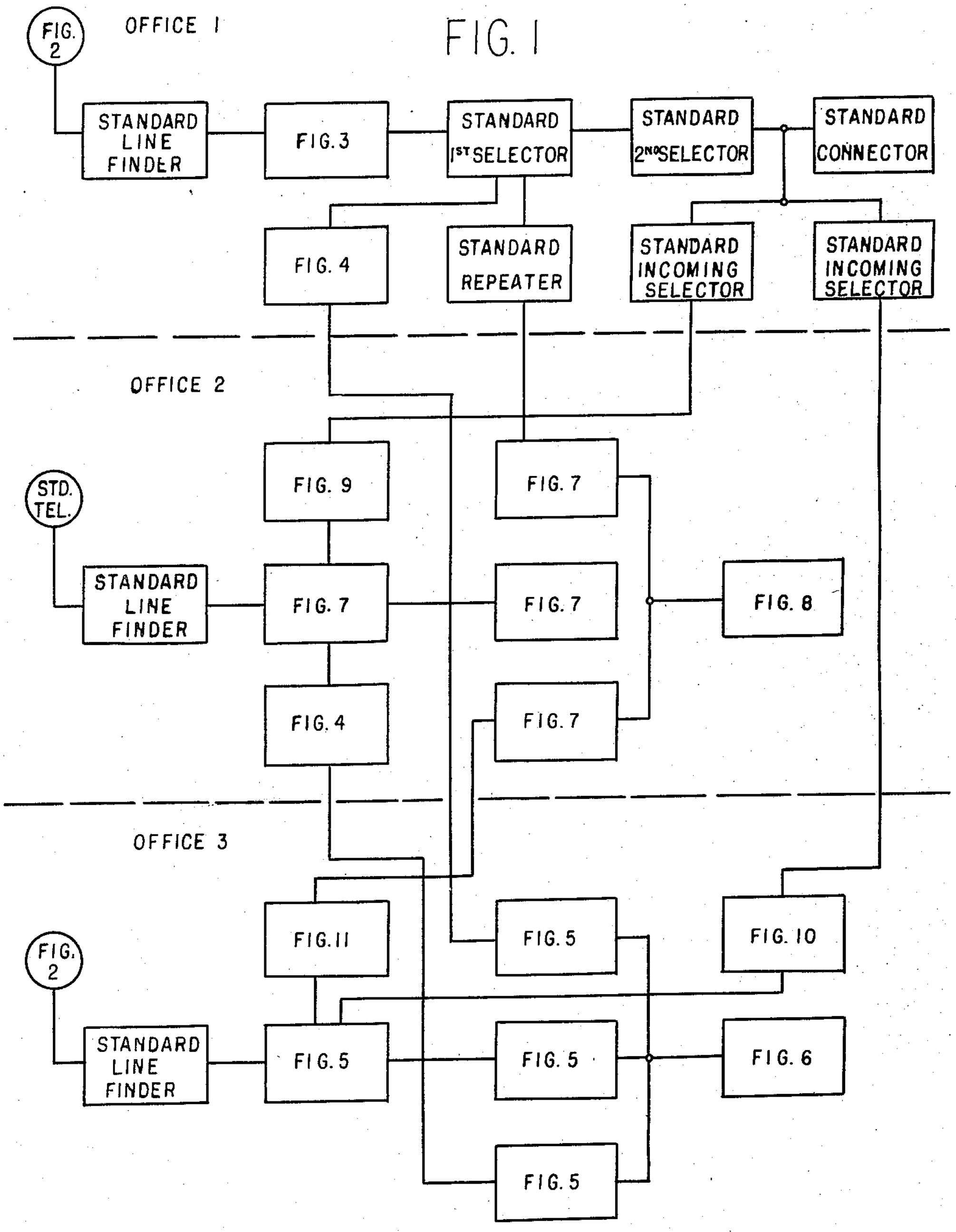
Figure 2:
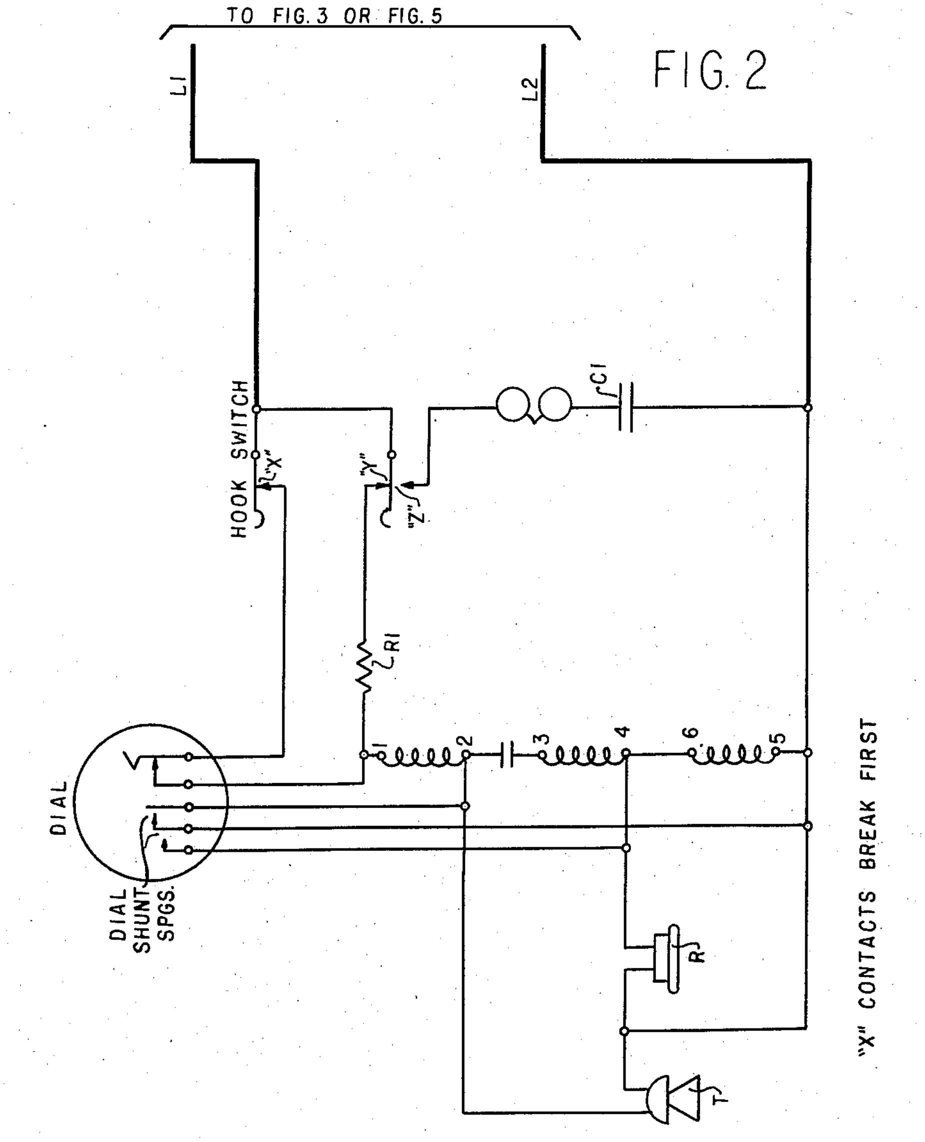

When one subscriber in Office 3 desires to call another subscriber in Office 3 and the telephones in Office 3 are all of the kind shown in Figure 2, it is necessary that a selector such as that shown in Figure 5 be used. This is so because Figure 5 shows a selector without a release relay, the function of the release relay being performed by the line relay. Since the dial springs of the telephone shown in Figure 2 do not open the circuit to the line relay and allow it to restore, but instead, interpose a resistance in the holding circuit of the line relay to thereby reduce the current flow through relay 230. It can be seen that relay 230 will remain operated throughout each series of impulses thereby making the use of a release relay unnecessary.

When the calling party lifts his handset, the hook switch contacts will make at "X" and "Y." Immediately, a linefinder will be seized and will begin to hunt for the calling line. At the same time, the linefinder will seize its associated selector which is a selector such as that shown in Figure 5. When the selector is seized relay 230 will operate over line conductors L1 and L2. When the calling party moves his dial off-normal the dial shunt springs will shunt the transmitter and receiver. As the dial returns to normal the dial pulse springs will be opened and closed to operate the line relay in the selector. Upon the first opening of the dial pulse springs resistance R1 is interposed in the holding circuit of line relay 230. The current flow through relay 230 is thus reduced but it should be noted that the current is not so far reduced as to allow the contacts of relay 230 to restore. A decrease of current flow through relay 230 causes an inductive surge of current to flow through the upper winding of relay 260 thereby operating the vertical magnet as before described. Further operation of this switch is completed in a manner described under the heading "Calls from Office 1 to Office 3."

When the selector shown in Figure 5 is used as a local selector as it is in this case, the dial tone lead through contacts 252 and 241 are to be used. As was previously pointed out, this lead is unnecessary when the selector is used as an incoming selector.

When the selector, responsive to automatic rotary trunk hunting, selects an idle connector such as that shown in Figure 6, relay 320 will operate. The pulses received by the connector, as in the case of the selector, will cause a decrease in current through relay 320. That decrease, however, is inadequate to allow the contacts of relay 320 to restore. The decrease of current is sufficient to create an inductive surge of current through the upper winding of relay 330 to thereby pulse the connector. As previously pointed out, since relay 320 does not release its contacts but holds them operated throughout pulsing, a release relay is not needed in this connector. Further operation of this connector is the same as described under the heading "Calls from Office 1 to Office 2" and a detailed description will not be repeated at this time.

*Calls from Office 3 to Office 1*

In calls from Office 3 to Office 1 the seelctor shown in Figure 5 and the repeater shown in Figure 10 are to be used. Since the operation of the selector shown in Figure 5 has previously been described under the heading of "Calls from Office 1 to Office 3," a further description will not at this time be given.

The repeater shown in Figure 10 is similar to that shown in Figure 9, the basic difference being that the former requires the pulsing springs to be bridged with a resistance. Thus a special telephone such as that shown in Figure 2 is required.

The operation of the preceding selector in searching for an idle repeater will be terminated when the battery potential through resistance R18 and contact 742 of the C lead is encountered by the control wiper of the preceding selector. The talking conductors L1 and L2 of the preceding selector will be switched through to seize the repeater shown in Figure 10. Upon seizure, relay 740 will operate and at contact 743 a preenergizing circuit will be completed through resistance R20 and the lower winding of relay 760. The C lead is grounded at contact 745 to hold all preceding switches operated. It will be noted at this time that no release relay is necessary in this repeater due to the fact that the dial pulse springs are bridged with the resistance and relay 740 will remain operated throughout pulsing. At contact 741, relay 730 is bridged across the outgoing trunks L1 and L2 thereby operating the line relay in the distant selector. Relay 730, being a polar relay, will not operate at this time. Resistance R17 is adjustable and its purpose is to regulate the pulsing resistance to the distant office so that all trunks required to be served will have about the same resistance. The momentary opening of the dial pulse springs will cause resistance R1 to be interposed in the holding circuit of the line relay 740. In response to the decrease of current flow through relay 740 an inductive pulse is sent through the upper winding of relay 760 thereby causing that relay to operate.

Relay 760 locks operated from battery over its lower winding through contacts 763 and 782 to ground at contact 743. At contact 762 the trunks L1 and L2 are opened. It will be noted that the pulsing contact 762, is bridged with a condenser C25, and a resistance R19. The purpose of this condenser and resistance is to absorb the inductive surge created by the deenergizing of the line relay in the distant office. At contact 761 the operating circuit for relay 770 is closed and relay 770 operates. At contact 765 the operating circuit for relay 720 is closed and relay 720 operates. The operation of relay 770 causes relay 780 to operate from ground at contact 761 through contact 771. At contact 773 the holding circuit for relay 720 is completed. The operation of relay 720 at contacts 723 and 724 places a direct shunt on relay 730. This is provided so that the distant line relay will be quick to operate when additional pulses are sent. It will be noted that relay 720 is slow-to-release and will maintain the shunt on relay 730 after the trunk is again closed by the release of relay 760. Relay 730 is of a rather high resistance for the purpose of preventing the full saturation of the line relay of the distant selector thereby causing it to be slow in its release upon the receipt of the first pulse. The higher resistance of relay 730 is provided only to prevent saturation of the line relay of the distant selector only on the first pulse. On succeeding pulses the shunt of relay 730 prevents the line relay from being slow-to-operate upon the restoration of relay 760. The operation of relay 780 bridges the outgoing trunks L1 and L2 with resistance R17 at contact 781. This allows the prenergizing of the line relay in the distant selector to begin immediately upon the operation of relay 780. At contact 782 the holding circuit to the lower winding of relay 760 is opened and relay 760 will restore. Relay 760 in restoring will remove ground from relay 770 and 780 and both relays will restore. Relay 770 in restoring will open the operating circuit for relay 720 but relay 720 will remain operated for a short time due to its slow-to-release feature. At about this time, a second pulse will be received from the dial springs of the calling telephone thus causing relay 760 to reoperate and at contact 765 the operating circuit for relay 720 is again closed. In this manner it can be seen that relay 720 remains operated throughout each series of impulses. The restoration of relay 780 opens the previously described preenergizing circuit for the line relay in the selector of the distant office at contact 781. At contact 782 the preenergizing circuit through resistance R20 and the lower winding of relay 760 is again completed. The restoration of relay 760 again closes the trunks L1 and L2 at contact 762 and causes the line relay in the distant selector to again operate. The above described operation is repeated for each pulse sent to the repeater, and the selector in Office 1 is operated in response to these pulses. When the incoming selector in Office 1 seizes an idle connector, additional pulses will se sent by the repeater shown in Figure 2 to operate the selected connector. At the termination of the final series of impulses, relay 720 will restore and at contact 723 the shunt on relay 730 will be removed. At contacts 722 and 724 the talking conductors L1 and L2 are prepared for conversation. When the called party lifts his handset the trunks L1 and L2 are reversed and this will cause relay 730 to operate, it being remembered that relay 730 is a polar relay and will only operate when the current flows in one direction. The operation of relay 730 will cause both relays 710 and 750 to operate from ground at contact 745 through operated contact 731. Relay 750 in operating at contact 752, opens the operating circuit through the upper winding of relay 760 to prevent any further pulsing if the calling party should happen to move the dial off-normal. At contact 751 a holding circuit for relay 750 is completed to ground at contact 745 exclusive of contact 731. This means that relay 750 is under the control of relay 740 and relay 750 will not restore until contact 745 of relay 740 is restored.

As previously pointed out relay 730 is of a rather high resistance in order to favor the first pulse to the line relay of the distant selector. It is also necessary that relay 730 be of high inductance in order that no loss to transmission will result. The high resistance of relay 730, along with the resistance of the trunk, will tend to allow the distant relay of the selector to restore when the called party answers and reverses current through relay 730. To avoid this possibility, relay 730 has been bridged with a neon tube, NL2. The distant line relay produces an inductive surge of high voltage when the current is reversed and is trying to flow through relay 730 in a reverse direction. This would tend to allow the distant relay to restore. The inductive surge of high voltage is more than enough to ionize the neon tube and to allow current to flow through said tube thereby holding the line relay operated.

The operation of relay 710 reverses battery to the calling party at contacts 711 and 713. At this time conversation may take place.

If, at the termination of conversation, the calling party first restores his handset, the holding circuit for relay 740 will be opened. At contact 741 the outgoing trunks L1 and L2 will be opened. At contact 743 the preenergizing circuit through the lower winding of relay 760 will be opened. At contact 745 ground will be removed from relays 710 and 750 both of which relays will restore. Relay 730 will remain operated until the called party restores his handset and reverses battery to normal. If the connector used in Office 1 is of the first party release type, battery will be reversed to relay 730 thereby causing it to restore when the calling party hangs up and it will not be necessary for the called party to restore his handset in order to restore relay 730. If on the other hand, the connector used is of the last party release type, battery will not be reversed until the called party restores his handset.

*Calls from Office 3 to Office 2*

The repeater shown in Figure 11 is used to repeat pulses received from the substation shown in Figure 2, to an inductively pulsed selector such as that shown in Figure 7.

In calls from Office 3 to Office 2, a selector such as that shown in Figure 5 is used to find an idle repeater such as that shown in Figure 11.

When the repeater in Figure 11 is seized, relay 820 will operate over the incoming trunks L1 and L2. The operation of relay 820 at contact 821 completes a pre-energizing circuit through resistance R22 and the lower winding of relay 830 to battery. At contact 823, relays 860 and 870 are bridged across the outgoing trunks. Relay 860 is a special type of relay and will not operate over either one of its windings alone. Therefore relay 860 will not operate at this time. At contact 825 the C lead is grounded to hold all preceding switches operated and to mark this repeater busy to other selectors.

Upon the first opening of the dial pulse springs, resistance R1 of Figure 2 is interposed in the holding circuit of relay 820 thereby causing relay 820 to partially de-energize and cause an inductive pulse to be sent through the upper winding of relay 830 causing relay 830 to operate. Rectifier E is to prevent any portion of the inductive surge from flowing back through the calling telephone circuit. Relay 830 locks operated through its own contact 835 to ground at 821. At contacts 831 and 833 the operating circuits are completed for relays 850 and 840, respectively. The operation of relay 840 at contact 841 provides a holding ground for relay 850. At contact 842 the holding circuit through the lower winding of relay 830 is opened and relay 830 will restore. At contact 844 the shunt on resistance R21 is removed and resistance R21 is now in the holding circuit of the line relay. The operation of relay 850 places a shunt on relay 870 and relay 860 through resistance R24 at contact 851. It will be noted that the operation of relay 840 will remove the shunt from resistance R21. The removal of this shunt now causes the current in the line relay of the distance office to decrease. The decrease of current flow through said line relay will cause an inductive pulse to operate the pulsing relay in the incoming selector of the distant office thereby advancing the switch swipers in the normal manner.

The restoration of relay 830 opens the operating circuits to relays 840 and 850 at contacts 833 and 831 respectively. The holding circuit through the lower winding of relay 830 is opened at contact 835. The restoration of relay 840 removes the holding ground from relay 850 at contacts 841 and 842 the preenergizing circuit for relay 830 is again completed. At contact 844 the shunt on resistance R21 is restored and this will cause an increase of current flow through the coil of the line relay in the succeeding selector.

It will be noted that relay 850 is slow-to-release and before relay 850 restores from the removal of ground at contacts 831 and 841 the next pulse will be incoming through relay 830 and again close a circuit to relay 850 and contact 831. Thus relay 850 will remain operated throughout pulsing. At the end of the receipt of all pulses relay 850 will restore, again closing the trunks L1 and L2 at contacts 852 and 854. The repeater is now prepared for conversation.

When the called party answers his telephone and removes his handset battery will be reversed in the connector and relay 860 will operate. The direction of current flow through the upper winding and the lower winding of relay 860 is now such that this relay will operate. At contact 861 the operating circuit for relay 810 is completed. The operation of relay 810 reverses battery at contacts 811 and 813.

It will be noted that in the repeater shown in Figure 11, a neon lamp NL3, is used in place of the ordinary condenser. A repeater is often used to pulse a circuit which holds its line relay through an impedance, such as for example, when pulsing from one repeater to another repeater. One trouble with this type of situation has been that when battery is reversed by the called party when he removes his handset, the reversal of current through the holding impedance coil causes the line relay of the repeater to restore. This opens the trunk circuit and may sometimes cause the pulsing relays to interrupt each other and may at other times cause the switches to release. In Figure 11 however, when relay 1 operates and reverses current through the holding impedance, the current through relay 820 is greatly reduced due to the inductive surge. To insure against the possibility of relay 820 restoring and thereby releasing the entire switch train, the neon tube, NL3, is used instead of the ordinary condenser. In this case, when the holding impedance reduces the current to the line relay 820, it causes an inductive pulse to reach relay 830 in the same manner as the dial pulse. This inductive pulse ionizes the neon lamp which operates relay 830 and holds relay 820 operated through its upper winding, even though the holding impedance tends to release relay 820. After the inductive pulse has been sent, the neon lamp will cease to pass any current and by this time the current through the inductive winding of relay 820 has been established so that the coil will now hold relay 820 operated. It is thus seen that in the cases in which a repeater is used to pulse from a circuit which holds its line relay through an impedance, a neon lamp in series with the upper winding of relay 830 is more effective than would be a condenser for the same purpose.

If the called party first restores his handset, battery in the connector will be reversed thus causing relay 860 in the repeater to restore. At contact 861 the operating circuit for relay 810 will be opened and relay 810 will restore, thus reversing the trunks L1 and L2 to normal. When the calling party restores his handset the circuit for relay 820 will be opened and relay 820 will restore its contacts. At contact 822 battery potential is placed on the C lead thereby preparing this repeater for further seizure.

It is to be understood that what has been herein described is by way of illustration only, and that certain changes may be made in the structure and organization of the material herein presented without deviating from the true spirit and scope of this invention.

What is claimed is:

1. In a telephone system, a first circuit including a first relay, a second circuit including a second relay connected to said first circuit and in bridge of said first relay, means for initially operating said first relay over said first circuit, means subsequently effective to intermittently decrease and restore the flow of current in said first circuit through said first relay, said decrease of current being ineffective to cause said first relay to restore, said second circuit being effective to operate said second relay in said second circuit over said bridge at the time said current flow is decreased, and said second relay restoring at the time the initial current flow is restored in said first circuit.

2. In a telephone system as claimed in claim 1, in which said means, which is effective to intermittently decrease and restore the flow of current through said first relay, comprises a normally closed set of pulsing contacts and a resistance, said resistance being shunted by said pulsing contacts, together with means for causing the operation of said pulsing contacts to thereby intermittently interpose said resistance in said first circuit serially with said first relay whereby said flow of current through said first relay is intermittently decreased and restored.

3. In a telephone system, a line, having at one end thereof a control contact, a pulsing contact, and an impedance element, and at the other end, a line relay having a winding and also an impulse responsive means connected to said winding; a direct current circuit including said winding and said line and controlled at said first end both by said pulsing contact and said control contact; said line relay energized over said circuit, said impedance element connected in physically shunting relation across said pulsing contact to that the reduction in current through said winding means incident to the opening of said pulsing contact, while not permitting said line relay to restore, sets up an inductive surge voltage across said winding for operating said impulse responsive means; and said line relay restored responsive to the opening of said circuit by said control contact.

4. In a telephone system, a first circuit comprising a first relay and means for causing current fluctuation therein, a second circuit comprising said first relay and a second relay, a direct current source of current common to both of said first and second circuits, means for completing said circuits to energize said first relay, while preventing the energization of said second relay, said first relay effective, responsive to the operation of said current fluctuation means for inducing a current in said second circuit to cause the energization of said second relay.

5. In a telephone system as claimed in claim 4, said current fluctuation means being ineffective to allow said first relay to restore.

6. In a telephone system, a pulsing circuit, a first relay and an impedance element and pulsing means in series in said circuit, a second circuit, said first relay and a second relay connected in series in said second circuit, means for energizing said first relay when said first circuit is closed, said pusing means in said first circuit reducing the flow of current therein to thereby cause a reduction of current flow in said first relay, said first relay effective, responsive to said reduction of current flow therein, to produce a surge of current in said second relay to energize the same, said impedance element being effective to prevent said surge of current from being dissipated in said first circuit.

7. In a telephone system, a normally incomplete direct current loop circuit comprising a relay, means comprising first and second contacts for completing said loop circuit to thereby energize said first relay thereover, a resistance and a set of normally closed pulsing contacts in said circuit, said pulsing contacts and said first contacts serially connecting with said first relay so as to shunt said resistance, means for opening and closing said pulsing contacts to control the current flow in said relay, means for opening said first contacts and for thereafter opening said second contacts, the opening of said first contacts being effective to remove said shunt from said resistance to thereby cause a decrease in the current flow in said circuit before it is opened by said second contacts, whereby sparking at said second contacts is prevented upon the subsequent opening of the same.

8. In a telephone system, a line, a control contact, a pulsing contact and an impedance element at one end of said line, and a switching apparatus including a guarding conductor at the other end, a line relay having a winding and a make contact, and also including an impulse responsive means connected to said winding; a direct current circuit including said winding and said line and controlled at said first end both by said pulsing control contact and said control contact; said line relay being operated over said circuit for applying a guarding potential to said guarding conductor at its own make contact, said impedance element being connecting in a physically shunting relation across said pulsing contact so that the reduction in current through said winding incident to the opening of said pulsing contact, while not permitting said line relay to restore, sets up an inductive surge of voltage across said winding for operating said impulse responsive means; and said line relay being restored responsive to the opening of said control contact for removing said guarding potential from said conductor at said make contact thereby to unguard said switching apparatus.

9. In a telephone system, a repeater, a first line relay in said repeater, a first incomplete line circuit comprising said first line relay, means for fluctuating the current therein, an incoming trunk, means for completing said first line circuit to thereby energize said first line relay, an incomplete second line circuit comprising a second line relay and an outgoing trunk, means responsive to the energization of said first line relay for completing said second line circuit and energizing said second line relay over said outgoing trunk, a pulsing circuit comprising a pulsing relay and said first line relay, said first line relay effective, responsive to said current fluctuations, for inductively pulsing said pulsing relay, and means responsive to the operation of said pulsing relay for intermittently controlling said outgoing trunk, to thereby pulse said second line relay.

10. In a telephone system as claimed in claim 9, wherein the initial energization of said pulsing relay causes said second line relay to restore, and wherein additional voltage is applied to said outgoing trunk prior to the subsequent closing of said trunk, to thereby cause the quick operation of said second line relay upon the subsequent closing of said trunk.

11. In a telephone system as claimed in claim 9, including means responsive to the initial energization of said pulsing relay for extending battery over said outgoing trunk to thereby increase the voltage for the subsequent transmission of pulses to said second line relay.

12. In a telephone system as claimed in claim 11, wherein said increased pulsing voltage is applied to said outgoing trunk only after the first pulse has been sent to said second line relay.

13. In a telephone system as claimed in claim 9, wherein said second line relay is a part of a switch train at the distant end of said outgoing trunk and wherein, upon the cessation of said outgoing pulses, the further operation of said pulsing relay is prevented.

14. In a telephone system, a line relay, a pulsing relay having a first and second winding, a resistance, a first incomplete circuit including said line relay, a second circuit including said line relay and said first winding of said pulsing relay, a third incomplete circuit including said second winding of said pulsing relay and said resistance in series, means for closing said first circuit to thereby cause said line relay to be energized, means responsive to the energization of said line relay for completing said third circuit to thereby preenergize said pulsing relay, means for reducing the current flow in said line relay over said first circuit, said line relay effective, in response to a reduction of current flow therein, to completely operate said pulsing relay.

15. In a telephone system as set out in claim 14, means responsive to said complete operation of said pulsing relay for shunting said resistance to thereby increase the flow of current in said third circuit and hold said pulsing relay operated.

16. In a telephone system, a repeater, a line circuit comprising a line relay and pulsing means, a release relay, the operation of said line relay being effective to cause the operation of said release relay, a pulsing circuit comprising said line relay and a first pulsing relay, an outgoing trunk associated with said first pulsing relay, said line relay effective, responsive to the operation of said pulsing means, for inductively operating said first pulsing relay to thereby open said outgoing trunk, means responsive to the operation of said first pulsing relay for holding the same operated, second and third pulsing relays, said first pulsing relay effective upon operating, to cause said second pulsing relay to operate, said second pulsing relay effective, upon operating, to cause said third pulsing relay to operate, means responsive to the operation of said third pulsing relay for removing said holding means from said first pulsing relay to thereby allow that relay to restore and close said outgoing trunk.

17. In a telephone system as claimed in claim 16, means responsive to the operation of said second pulsing relay for holding said release relay operated.

18. In a telephone system as claimed in claim 17, means responsive to the release of said first pulsing relay for releasing said second and third pulsing relays to thereby prepare said relays for the next succeeding pulse.

19. In a telephone system, a repeater, a line circuit comprising a line relay and pulsing means, an inductive pulsing circuit comprising said line relay and a pulsing relay, an outgoing trunk in said repeater, means responsive to the initial operation of said line relay for closing said trunk, said line relay effective, responsive to operation of said pulsing means, for inductively operating said pulsing relay over said inductive pulsing circuit, means responsive to the operation of said last mentioned relay for varying the flow of current over said trunk, and means responsive to the release of said inductive pulsing relay for restoring the flow of current over said trunk to normal.

20. In a telephone system as claimed in claim 19, said means for increasing the flow of current over said trunk comprising an impedance element, said impedance element being bridged across said outgoing trunk upon the operation of said line relay, means responsive to the operation of said pulsing relay for shunting said impedance element to thereby cause an increase in the flow of current over said trunk.

21. In a telephone system as claimed in claim 20, means responsive to the release of said pulsing relay for removing said shunt from said impedance element to thereby cause a decrease in the flow of current over said trunk.

22. In a telephone system, a trunk, at one end of said trunk, a repeater; at the other end of said trunk, a numerical switch, a first line relay in said repeater, a pulsing relay, a second line relay in said numerical switch, an incomplete line circuit comprising said second line relay and an impedance element, means responsive to the initial operation of said first line relay for completing said line circuit over said trunk, means responsive to the subsequent operation of said first line relay for inductively operating said pulsing relay, means responsive to the operation of said pulsing relay for intermittently shunting said impedance element to thereby cause a series of fluctuations of current to flow through said second line relay over said trunk, whereby inductive pulses are generated by said last mentioned relay.

23. In a telephone system as claimed in claim 22, means for maintaining said second line circuit closed over said trunk throughout said series of current fluctuations.

24. In a telephone system, a repeater, a line circuit comprising a line relay and means for fluctuating the flow of current therein, a first pulsing circuit comprising a first pulsing relay and said line relay, an outgoing trunk comprising a normally open pair of conductors, a second pulsing circuit comprising a second pulsing relay and said outgoing trunk, means for initially energizing said line relay, means responsive thereto for closing said conductors, thereby energizing said second pulsing relay over said conductors, means responsive to said current fluctuation means for inductively pulsing said first pulsing relay to thereby control the flow of current over said outgoing trunk to repeat said pulses over said outgoing trunk to said second pulsing relay.

25. In a telephone system as claimed in claim 24, wherein the initial energization of said line relay closes said conductors and interposes an impedance element into said second pulsing circuit to thereby prevent said second pulsing relay from becoming fully saturated and slow to release.

26. In a telephone system as claimed in claim 25, wherein the initial energization of said first pulsing relay is effective to open said outgoing trunk, further means, responsive to the energization of said first pulsing relay, for shunting said impedance element, thereby causing said second relay to operate quickly for all succeeding pulses repeated.

27. In a telephone system as claimed in claim 26, a neon tube, said neon tube being bridged across said impedance element, means for removing said shunt circuit from said impedance element at the termination of each series of said current fluctuations, said neon tube effective, responsive to the removal of said shunt circuit, to prevent said impedance element from acting as a high resistance in said second pulsing circuit.

28. In a telephone system as claimed in claim 24, means responsive to each energization of said first pulsing relay for completing a preenergizing circuit through said second pulsing relay.

29. In a telephone system as claimed in claim 24, a pair of pulsing contacts associated with said first pulsing relay, said pulsing contacts being bridged with a condenser and a resistance in series with each other, and wherein the energization of said first pulsing is effective to interpose said resistance and condenser in said second pulsing circuit, to thereby cause a short delay in the deenergization of said second pulsing relay.

30. In a telephone system as claimed in claim 24, wherein said current fluctuation means, while being effective to cause said first pulsing relay to pulse, are ineffective to allow said line relay to restore during pulsing.

31. In a telephone system, a trunk, at one end of said trunk a pulse repeater, at the other end of said trunk a pulse receiving relay, means in said repeater for intermittently opening and closing said trunk responsive to pulses received by said repeater, to thereby repeat said received pulses to said pulse receiving relay, means responsive to the opening of said trunk for closing a preenergizing circuit through said pulse receiving relay, and means responsive to the closure of said trunk for opening said preenergizing circuit.

32. In a telephone system, a line, at one end of said line, pulsing contacts, at the other end of said line a numerical switch comprising a line relay, a pulsing relay and a magnet, said line relay effective, responsive to the operation of said pulsing contacts, to inductively pulse said pulsing relay, and means responsive to the operation of said pulsing relay for operating said magnet.

33. In a telephone system, an automatic telephone including a set of pulsing springs, a numerical switch, a first relay in said switch, a primary circuit including said pulsing springs and said first relay, means for energizing and operating said first relay over said primary circuit, a condenser and a second relay in said switch, a secondary circuit, including said condenser and said first and second relays, for energizing and operating said second relay, a magnet in said switch, the operation of said magnet being dependent upon the operation of said second relay, means for completing said primary circuit to initially energize and operate said first relay, said condenser preventing the concurrent energization and operation of said second relay over said secondary circuit, means for opening said pulsing springs to cause said first relay to deenergize and restore, said deenergization causing an inductive surge of current to flow through said secondary circuit causing said second relay to energize and operate, thereby causing said magnet to operate.

34. In a telephone system as claimed in claim 33, said second relay having a locking circuit, said locking circuit including normally closed contacts controlled by said magnet, said second relay being maintained operated over said locking circuit to thereby hold said magnet operated until said normally closed contacts are opened by the operation of said magnet.

35. In a telephone system as claimed in claim 33, means responsive to the seizure of said switch for completing a preenergizing circuit through said second relay to thereby make said second relay fast to operate.

36. In a telephone system, a line, at one end of said line a pulsing contact and at the other end a selector comprising a line relay, and also comprising a pulsing relay and a changeover relay controlled by said pulsing relay; a direct current loop circuit extending over said line and controlled by said pulsing contact for the transmission of a series of impulses; said line relay being operated in said loop circuit for causing the operation of said changeover relay; said changeover relay being effective upon operating for connecting said pulsing relay across said line relay to enable said pulsing relay to operate responsive to the inductive pulses set up across said line relay upon the opening of said pulsing contact; and said changeover relay releasing under the control of said pulsing relay incident to the termination of said impulse series for disconnecting said pulsing relay from across said line relay.

37. In a telephone system, a line, at one end of said line a pulsing contact and at the other end a numerical switch, said switch comprising a stepping magnet having a make contact, a battery feeding bridge including a line relay, an impulse responsive means connected to said bridge and a release relay; a direct current loop circuit extending over said bridge and said line and controlled by said pulsing contact for the transmission of impulses over said line, said line relay being operated over said loop circuit for controlling said release relay; said impulse responsive means operating from the inductive surge set up across said bridge upon the opening of said pulsing contact for operating said magnet, and said make contact being effective upon the operation of said magnet for closing a holding circuit for said release relay.

38. In a telephone system, a line, at one end of said line a control contact, a pulsing contact and an impedance element and at the other end a numerical switch having associated therewith a line relay having winding means and a break contact, and also an impulse responsive means connected to said winding means; a direct current line extending over said winding means and said line and controlled at said first end both by said pulsing contact and said control contact; said line relay being operated in said circuit, and said impedance element being connected in physically shunting relation across said pulsing contact so that the reduction of current through said winding means incident to each opening of said pulsing contact, while not permitting said line relay to restore, sets up an inductive surge voltage across said winding means each time for operating said impulse responsive means; means for advancing said switch in accordance with the intermittent operations of said impulse responsive means; off-normal contact means actuated when said switch moves off-normal; and a release circuit for said switch including said off-normal contact means and completed directly at the break contact of said line relay when the last mentioned relay restores upon the opening of said line circuit at said control contact, thereby making it impossible for a calling subscriber to cause said connector by manipulation of the hook switch, to switch through on a busy line.

39. In a numerical switch, a line, at one end of said line, pulsing contacts, said contacts bridged with an impedance element, at the other end of said line, a line relay and impulse responsive means, a control lead in said switch, means associated with said line relay for extending control potential over said control lead, a direct current loop circuit including said line relay and said pulsing contacts, the operation of said pulsing contacts causing said impedance element to be interposed in said loop circuit to thereby cause a reduction of current through said line relay, said reduction of current sufficient to create an inductive surge of current to operate said impulse responsive means, but at the same time insufficient to permit said line relay to restore and remove said control potential from said control lead.

40. In a combination as set out in claim 39, a magnet, the operation of said impulse responsive means being effective to cause the operation of said magnet, a locking circuit for said impulse responsive means, said circuit including normally closed contacts associated with said magnet, said impulse responsive means being held operated until the operation of said magnet thereby insuring the complete operation of said magnet.

References Cited in the file of this patent

UNITED STATES PATENTS

| | | |
|---|---|---|
| 1,252,466 | McQuarrie et al. | Jan. 8, 1918 |
| 1,284,206 | Adams | Nov. 12, 1918 |